US012628212B2

(12) United States Patent
Yang et al.

(10) Patent No.: US 12,628,212 B2
(45) Date of Patent: May 12, 2026

(54) NEIGHBORHOOD AWARE NETWORK-BASED DEVICE CONNECTION METHOD AND DEVICE

(71) Applicant: HUAWEI TECHNOLOGIES CO., LTD., Guangdong (CN)

(72) Inventors: Chao Yang, Nanjing (CN); Zhongyin Jiang, Nanjing (CN); Bo Ling, Shenzhen (CN); Keyang Yin, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 805 days.

(21) Appl. No.: 17/922,267

(22) PCT Filed: Mar. 12, 2021

(86) PCT No.: PCT/CN2021/080527
§ 371 (c)(1),
(2) Date: Oct. 28, 2022

(87) PCT Pub. No.: WO2021/218451
PCT Pub. Date: Apr. 11, 2021

(65) Prior Publication Data
US 2023/0180315 A1 Jun. 8, 2023

(30) Foreign Application Priority Data
Apr. 30, 2020 (CN) ......................... 202010367852.X

(51) Int. Cl.
*H04W 76/14* (2018.01)
*H04W 48/10* (2009.01)
(52) U.S. Cl.
CPC ........... *H04W 76/14* (2018.02); *H04W 48/10* (2013.01)

(58) Field of Classification Search
CPC ..... H04W 76/14; H04W 48/10; H04W 76/15; H04W 84/12; H04W 76/19
See application file for complete search history.

(56) References Cited

U.S. PATENT DOCUMENTS

| | | | | |
|---|---|---|---|---|
| 2015/0081840 A1 * | 3/2015 | Patil | ........................ | H04L 67/51 709/217 |
| 2015/0350866 A1 * | 12/2015 | Patil | ...................... | H04W 8/005 370/254 |

(Continued)

FOREIGN PATENT DOCUMENTS

| | | |
|---|---|---|
| CN | 105450282 A | 3/2016 |
| CN | 106714329 A | 5/2017 |
| CN | 111615220 A | 9/2020 |

OTHER PUBLICATIONS

International Search Report and Written Opinion in International Appln. No. PCT/CN2021/080527, mailed on May 26, 2021, 17 pages (with English translation).

*Primary Examiner* — Rina C Pancholi
(74) *Attorney, Agent, or Firm* — Fish & Richardson P.C.

(57) ABSTRACT

This application provides network-based device connection methods and devices. One method includes: receiving a first broadcast message from a second device and a second broadcast message from a third device, in response to determining that a quantity of available Wi-Fi connections of the second device is not greater than zero, and the second device is not connected to the first device through Wi-Fi, determining, based on connected device information of the second device and available Wi-Fi connection information of the third device, that the third device is connected to the second device through Wi-Fi and that a quantity of available Wi-Fi connections of the third device is greater than zero, and establishing a Wi-Fi link between the first device and the third device for the third device to forward the first packet (Continued)

received from the first device to the second device through a Wi-Fi link between the third device and the second device.

20 Claims, 33 Drawing Sheets

(56)                    References Cited

U.S. PATENT DOCUMENTS

| | | | |
|---|---|---|---|
| 2016/0006483 A1* | 1/2016 | Nishi | H04B 5/20 |
| | | | 455/41.1 |
| 2017/0223579 A1* | 8/2017 | Lee | H04W 36/035 |
| 2018/0332631 A1* | 11/2018 | Li | H04W 76/14 |
| 2019/0007888 A1* | 1/2019 | Li | H04W 40/12 |

* cited by examiner

| | Wi-Fi | Zigbee (Zigbee) | BLE |
|---|---|---|---|
| Sleep | 10 μW | 4 μW | 8 μW |
| Receive power (receive (Rx) power) | 90 μW | 84 μW | 28.5 μW |
| Transmit power (transmit (Tx) power) | 350 μW | 72 μW | 26.5 μW |
| Average power for 10 messages per day (average power for 10 messages per day) | 500 μW | 414 μW | 50 μW |

FIG. 2

CONT. FROM FIG. 4A

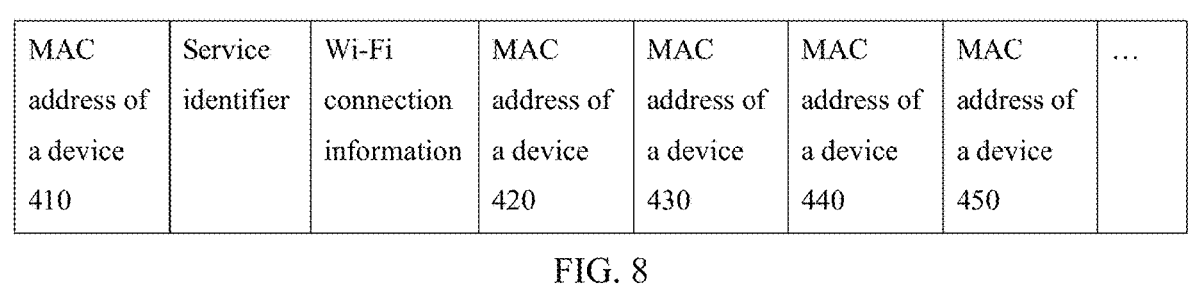

| MAC address of a device 410 | Service identifier | Wi-Fi connection information | MAC address of a device 420 | MAC address of a device 430 | MAC address of a device 440 | MAC address of a device 450 | ... |
|---|---|---|---|---|---|---|---|

FIG. 8

| Discovered devices | MAC Address | Quantity of available connections | RSSI value | Quantity of connected devices | Device type |
|---|---|---|---|---|---|
| Device 410 | MAC address D1 | 0 | Value R1 | 4 | Mobile phone |
| Device 420 | MAC address D2 | 2 | Value R2 | 2 | Large-screen device |
| Device 430 | MAC address D3 | 3 | Value R3 | 1 | Stereo |
| Device 440 | MAC address D4 | 3 | Value R4 | 1 | Stereo |
| Device 450 | MAC address D5 | 3 | Value R5 | 1 | Watch |
| Device 460 | MAC address D6 | 3 | Value R6 | 1 | Stereo |

NEIGHBORHOOD AWARE NETWORK-BASED DEVICE CONNECTION METHOD AND DEVICE

CROSS-REFERENCE TO RELATED APPLICATIONS

This application is a national stage of International Application No. PCT/CN2021/080527, filed March 12, 2021, which claims priority to Chinese Patent Application No. 202010367852.X, filed Apr. 30, 2020. Both of the aforementioned applications are hereby incorporated by reference in their entireties.

TECHNICAL FIELD

This application relates to the field of wireless network technologies, and specifically, to a neighborhood aware network-based device connection method and a device.

BACKGROUND

A wireless-fidelity neighborhood aware network (Wi-Fi NAN) is a point-to-point interconnection and interworking Wi-Fi wireless network mesh communication technology. This technology can bypass a network infrastructure (such as an access point (AP) or a cellular network), implement a one-to-one, one-to-many, or many-to-many Wi-Fi connection between devices in a same Wi-Fi NAN, and provide services such as file sharing and data mutual transmission.

Usually, a quantity of devices to which a device can be directly connected through Wi-Fi is limited. Direct connection through Wi-Fi means that two devices are directly connected through their respective Wi-Fi interfaces without forwarding by a relay device. A maximum quantity of devices to which a device can be connected in a Wi-Fi direct connection manner may be referred to as a maximum quantity of connections of the device, and a quantity of devices that can be further connected to the device in the Wi-Fi direct connection manner is referred to as a quantity of available connections of the device. When a quantity of available connections of a device 1 is not greater than 0, that is, when a quantity of devices to which the device 1 is currently connected reaches a maximum quantity of connections, the device 1 rejects a Wi-Fi connection request from another device (for example, a device 2).

Currently, when a Wi-Fi connection of the device 2 is rejected by the device 1, the device 2 may give up connecting to the device 1 through Wi-Fi. Alternatively, the user may add a wireless router, so that the device 2, the device 1, and a device to which the device 1 is connected through Wi-Fi are indirectly connected by using the wireless router. That is, the device 2 and the device 1 are connected by using a conventional Wi-Fi technology instead of a Wi-Fi NAN technology.

SUMMARY

Embodiments of this application provide a neighborhood aware network (Wi-Fi NAN)-based device connection method. When a target device cannot be directly connected through Wi-Fi, a device to which the target device is connected through Wi-Fi may be connected, so that the target device is connected through a multi-hop Wi-Fi link.

According to a first aspect, an embodiment of this application provides a neighborhood aware network (Wi-Fi NAN)-based device connection method. The method may be performed by a first device that supports a neighborhood aware network protocol. The method includes: receiving a first broadcast message from a second device, where the first broadcast message includes connected device information of the second device and Wi-Fi connection information of the second device, and the connected device information is used to represent a device to which the second device is connected through Wi-Fi; receiving a second broadcast message from a third device, where the second broadcast message includes Wi-Fi connection information of the third device; determining that the second device is a target device; when a quantity of available Wi-Fi connections of the second device is not greater than zero, and the second device is not a device to which the first device is connected through Wi-Fi, determining, based on the connected device information of the second device and available Wi-Fi connection information of the third device, that the third device belongs to the device to which the second device is connected through Wi-Fi and that a quantity of available Wi-Fi connections of the third device is greater than zero, where the quantity of available Wi-Fi connections of the second device is determined based on the Wi-Fi connection information of the second device; sending a Wi-Fi link establishment request to the third device, to establish a Wi-Fi link between the first device and the third device; and sending, to the third device through the Wi-Fi link between the first device and the third device, a first packet whose destination is the second device, so that the third device forwards the first packet to the second device through a Wi-Fi link between the third device and the second device.

In other words, the first device receives a broadcast message sent by the second device and a broadcast message sent by the third device. When the first device is intended to connect to the second device through Wi-Fi, if the second device has no available Wi-Fi interface, and the second device is not the device to which the first device is connected through Wi-Fi, it may be determined, based on information carried in the broadcast message sent by the second device and information carried in the broadcast message sent by the third device, that the third device may serve as a relay device between the first device and the second device. Further, the first device may request to establish a Wi-Fi link between the first device and the second device, to establish a multi-hop Wi-Fi link between the first device and the second device, so that a packet that is sent by the first device and whose destination is the second device can be forwarded by the third device, and then reach the second device.

In a possible implementation, the method further includes: when the quantity of available Wi-Fi connections of the second device is greater than zero, and the second device is not the device to which the first device is connected through Wi-Fi, sending a Wi-Fi link establishment request to the second device, to establish the Wi-Fi link between the first device and the second device.

In other words, in this implementation, whether the second device has an available Wi-Fi interface may be quickly determined based on the broadcast information sent by the second device. If the second device has the available Wi-Fi interface, the second device may quickly establish the Wi-Fi link between the first device and the second device. Therefore, when the second device has the available Wi-Fi interface, the first device and the second device may exchange information through the direct Wi-Fi link between the first device and the second device.

In a possible implementation, the first broadcast message further includes a first service identifier, and the first service identifier is used to represent a service that can be provided by the second device. The determining that the second device is a target device includes: searching a local service interest list for a service identifier corresponding to the first service identifier, where the local service interest list includes at least one service identifier, and the at least one service identifier is used to represent at least one service required by the first device; and when the service identifier corresponding to the first service identifier is found in the local service interest list, determining that the second device is the target device.

In other words, in this implementation, the target device may be automatically determined for the first device by using a service required by the first device and a service that can be provided by another device, so that automatic connection between devices can be implemented.

In a possible implementation, the first broadcast message further includes identifier information of the second device. The determining that the second device is a target device includes: displaying a first interface, where the first interface includes a first function area corresponding to the identifier information; and in response to an operation for the first function area, determining that the second device is the target device.

In other words, in this implementation, the first device may display a device detected by the first device, so that a user can freely select the target device. This improves operation experience of the user.

In a possible implementation, the Wi-Fi connection information of the second device includes a maximum quantity of Wi-Fi connections of the second device or the quantity of available Wi-Fi connections of the second device. When the Wi-Fi connection information of the second device includes the maximum quantity of Wi-Fi connections of the second device, the quantity of available Wi-Fi connections of the second device is determined based on the maximum quantity of Wi-Fi connections of the second device and the connected device information of the second device.

In other words, in this implementation, whether the second device has an available Wi-Fi interface may be quickly determined based on the quantity of available Wi-Fi connections of the second device, or based on the maximum quantity of Wi-Fi connections of the second device and the connected device information of the second device. This helps quickly determine a manner of a connection to the second device.

In a possible implementation, the Wi-Fi connection information of the third device includes a maximum quantity of Wi-Fi connections of the third device or the quantity of available Wi-Fi connections of the third device. When the Wi-Fi connection information of the third device includes the maximum quantity of Wi-Fi connections of the third device, the second broadcast message further includes connected device information of the third device, and the quantity of available Wi-Fi connections of the third device is determined based on the maximum quantity of Wi-Fi connections of the third device and the connected device information of the third device.

In other words, in this implementation, whether the third device can serve as the relay device may be quickly determined based on the quantity of available Wi-Fi connections of the third device, or based on the maximum quantity of Wi-Fi connections of the third device and the connected device information of the second device.

In a possible implementation, the connected device information of the second device includes a MAC address of the device to which the second device is connected through Wi-Fi.

In other words, in this implementation, the connected device information includes the MAC address of the device, so that the first device can quickly obtain a MAC address of the third device, to quickly send the Wi-Fi link establishment request to the third device based on a MAC address of the second device, and quickly establish a Wi-Fi link.

In a possible implementation, the first broadcast message belongs to a Bluetooth broadcast frame, and/or the second broadcast message belongs to a Bluetooth broadcast frame.

In other words, the device may send the broadcast message through Bluetooth, so that power consumption of the device can be reduced.

According to a second aspect, an embodiment of this application provides an electronic device, where the electronic device supports a neighborhood aware network (Wi-Fi NAN) protocol. The electronic device includes a processor and a memory. The memory is configured to store computer instructions. When the electronic device runs, the processor executes the computer instructions, so that the electronic device performs the following operations: receiving a first broadcast message from a second device, where the first broadcast message includes connected device information of the second device and Wi-Fi connection information of the second device, and the connected device information is used to represent a device to which the second device is connected through Wi-Fi; receiving a second broadcast message from a third device, where the second broadcast message includes Wi-Fi connection information of the third device; determining that the second device is a target device; when a quantity of available Wi-Fi connections of the second device is not greater than zero, and the second device is not a device to which the first device is connected through Wi-Fi, determining, based on the connected device information of the second device and available Wi-Fi connection information of the third device, that the third device belongs to the device to which the second device is connected through Wi-Fi and that a quantity of available Wi-Fi connections of the third device is greater than zero, where the quantity of available Wi-Fi connections of the second device is determined based on the Wi-Fi connection information of the second device; sending a Wi-Fi link establishment request to the third device, to establish a Wi-Fi link between the first device and the third device; and sending, to the third device through the Wi-Fi link between the first device and the third device, a first packet whose destination is the second device, so that the third device forwards the first packet to the second device through a Wi-Fi link between the third device and the second device.

In a possible implementation, the processor executes the computer instructions, so that the electronic device further performs the following operation: when the quantity of available Wi-Fi connections of the second device is greater than zero, and the second device is not the device to which the electronic device is connected through Wi-Fi, sending a Wi-Fi link establishment request to the second device, to establish a Wi-Fi link between the electronic device and the second device.

In a possible implementation, the first broadcast message further includes a first service identifier, and the first service identifier is used to represent a service that can be provided by the second device. The processor executes the computer instructions, so that the electronic device further performs the following operations: searching a local service interest list for a service identifier corresponding to the first service identifier, where the local service interest list includes at least one service identifier, and the at least one service identifier is used to represent at least one service required by the electronic device; and when the service identifier corresponding to the first service identifier is found in the local service interest list, determining that the second device is the target device.

In a possible implementation, the first broadcast message further includes identifier information of the second device. The processor executes the computer instructions, so that the electronic device further performs the following operations: displaying a first interface, where the first interface includes a first function area corresponding to the identifier information; and in response to an operation for the first function area, determining that the second device is the target device.

In a possible implementation, the Wi-Fi connection information of the second device includes a maximum quantity of Wi-Fi connections of the second device or the quantity of available Wi-Fi connections of the second device. When the Wi-Fi connection information of the second device includes the maximum quantity of Wi-Fi connections of the second device, the quantity of available Wi-Fi connections of the second device is determined based on the maximum quantity of Wi-Fi connections of the second device and the connected device information of the second device.

In a possible implementation, the Wi-Fi connection information of the third device includes a maximum quantity of Wi-Fi connections of the third device or the quantity of available Wi-Fi connections of the third device. When the Wi-Fi connection information of the third device includes the maximum quantity of Wi-Fi connections of the third device, the second broadcast message further includes connected device information of the third device, and the quantity of available Wi-Fi connections of the third device is determined based on the maximum quantity of Wi-Fi connections of the third device and the connected device information of the third device.

In a possible implementation, the connected device information of the second device includes a MAC address of the device to which the second device is connected through Wi-Fi.

In a possible implementation, the first broadcast message belongs to a Bluetooth broadcast frame, and/or the second broadcast message belongs to a Bluetooth broadcast frame.

It may be understood that the electronic device provided in the second aspect is configured to perform the method provided in the first aspect. Therefore, for beneficial effects that can be achieved by the electronic device, refer to the foregoing corresponding beneficial effects.

According to a third aspect, an embodiment of this application provides a neighborhood aware network-based device connection apparatus. The apparatus is configured in a first device that supports a neighborhood aware network (Wi-Fi NAN) protocol. The apparatus includes a receiving unit, a first determining unit, a second determining unit, and a sending unit. The receiving unit is configured to receive a first broadcast message from a second device, where the first broadcast message includes connected device information of the second device and Wi-Fi connection information of the second device, and the connected device information is used to represent a device to which the second device is connected through Wi-Fi. The receiving unit is further configured to receive a second broadcast message from a third device, where the second broadcast message includes Wi-Fi connection information of the third device. The first determining unit is configured to determine that the second device is a target device. The second determining unit is further configured to: when a quantity of available Wi-Fi connections of the second device is not greater than zero, and the second device is not a device to which the first device is connected through Wi-Fi, determine, based on the connected device information of the second device and available Wi-Fi connection information of the third device, that the third device belongs to the device to which the second device is connected through Wi-Fi and that a quantity of available Wi-Fi connections of the third device is greater than zero, where the quantity of available Wi-Fi connections of the second device is determined based on the Wi-Fi connection information of the second device. The sending unit is configured to send a Wi-Fi link establishment request to the third device, to establish a Wi-Fi link between the first device and the third device. The sending unit is further configured to send, to the third device through the Wi-Fi link between the first device and the third device, a first packet whose destination is the second device, so that the third device forwards the first packet to the second device through a Wi-Fi link between the third device and the second device.

In a possible implementation, the sending unit is further configured to: when the quantity of available Wi-Fi connections of the second device is greater than zero, and the second device is not the device to which the electronic device is connected through Wi-Fi, send a Wi-Fi link establishment request to the second device, to establish a Wi-Fi link between the electronic device and the second device.

In a possible implementation, the first broadcast message further includes a first service identifier, and the first service identifier is used to represent a service that can be provided by the second device. The apparatus further includes a search unit. The search unit is configured to search a local service interest list for a service identifier corresponding to the first service identifier, where the local service interest list includes at least one service identifier, and the at least one service identifier is used to represent at least one service required by the electronic device. The first determining unit is further configured to: when the service identifier corresponding to the first service identifier is found in the local service interest list, determine that the second device is the target device.

In a possible implementation, the first broadcast message further includes identifier information of the second device. The apparatus further includes a display unit. The display unit is configured to display a first interface, where the first interface includes a first function area corresponding to the identifier information. The first determining unit is configured to: in response to an operation for the first function area, determine that the second device is the target device.

In a possible implementation, the Wi-Fi connection information of the second device includes a maximum quantity of Wi-Fi connections of the second device or the quantity of available Wi-Fi connections of the second device. When the Wi-Fi connection information of the second device includes the maximum quantity of Wi-Fi connections of the second device, the quantity of available Wi-Fi connections of the second device is determined based on the maximum quantity of Wi-Fi connections of the second device and the connected device information of the second device.

In a possible implementation, the Wi-Fi connection information of the third device includes a maximum quantity of Wi-Fi connections of the third device or the quantity of available Wi-Fi connections of the third device. When the Wi-Fi connection information of the third device includes the maximum quantity of Wi-Fi connections of the third device, the second broadcast message further includes connected device information of the third device, and the quantity of available Wi-Fi connections of the third device is determined based on the maximum quantity of Wi-Fi connections of the third device and the connected device information of the third device.

In a possible implementation, the connected device information of the second device includes a MAC address of the device to which the second device is connected through Wi-Fi.

In a possible implementation, the first broadcast message belongs to a Bluetooth broadcast frame, and/or the second broadcast message belongs to a Bluetooth broadcast frame.

It may be understood that the apparatus provided in the third aspect is configured to perform the method provided in the first aspect. Therefore, for beneficial effects that can be achieved by the apparatus, refer to the foregoing corresponding beneficial effects.

According to a fourth aspect, an embodiment of this application provides a neighborhood aware network (Wi-Fi NAN) system. The system includes at least a first device, a second device, and a third device. The second device is configured to send a first broadcast message to the first device, where the first broadcast message includes connected device information of the second device and Wi-Fi connection information of the second device, and the connected device information is used to represent a device to which the second device is connected through Wi-Fi. The third device is configured to send a second broadcast message to the first device, where the second broadcast message includes Wi-Fi connection information of the third device. The first device is configured to determine that the second device is a target device. When a quantity of available Wi-Fi connections of the second device is not greater than zero, and the second device is not a device to which the first device is connected through Wi-Fi, the first device is configured to determine, based on the connected device information of the second device and available Wi-Fi connection information of the third device, that the third device belongs to the device to which the second device is connected through Wi-Fi and that a quantity of available Wi-Fi connections of the third device is greater than zero, where the quantity of available Wi-Fi connections of the second device is determined based on the Wi-Fi connection information of the second device. The first device is configured to send a Wi-Fi link establishment request to the third device, to establish a Wi-Fi link between the first device and the third device. The first device is configured to send, to the third device through the Wi-Fi link between the first device and the third device, a first packet whose destination is the second device. The third device is configured to forward the first packet to the second device through a Wi-Fi link between the third device and the second device.

It may be understood that the system provided in the fourth aspect is configured to perform the method provided in the first aspect. Therefore, for beneficial effects that can be achieved by the system, refer to the foregoing corresponding beneficial effects.

According to a fifth aspect, an embodiment of this application further provides a chip system, including a processor and an interface circuit. The processor is connected to the interface circuit, and is configured to execute instructions, so that an electronic device on which the chip system is installed performs the method provided in the first aspect.

It may be understood that the chip system provided in the fifth aspect is configured to perform the method provided in the first aspect. Therefore, for beneficial effects that can be achieved by the chip system, refer to the foregoing corresponding beneficial effects.

According to a sixth aspect, an embodiment of this application provides a computer storage medium. The computer storage medium includes computer instructions, and when the computer instructions are run on an electronic device, the electronic device is enabled to perform the method provided in the first aspect.

It may be understood that the computer storage medium provided in the sixth aspect is configured to perform the method provided in the first aspect. Therefore, for beneficial effects that can be achieved by the computer storage medium, refer to the foregoing corresponding beneficial effects.

According to a seventh aspect, an embodiment of this application provides a computer program product. When program code included in the computer program product is executed by a processor used in a device, the method provided in the first aspect is implemented.

It may be understood that the computer program product provided in the seventh aspect is configured to perform the method provided in the first aspect. Therefore, for beneficial effects that can be achieved by the computer program product, refer to the foregoing corresponding beneficial effects.

According to the solutions provided in embodiments of this application, when a quantity of available Wi-Fi connections of a target device is not greater than 0, a scanning device can quickly determine a relay device from devices to which the target device is connected through Wi-Fi, and establish a multi-hop Wi-Fi connection between the scanning device and the target device by using the relay device, so that the scanning device can be connected to the target device through Wi-Fi.

BRIEF DESCRIPTION OF DRAWINGS

FIG. 2 is a diagram of a comparison between power consumption of different communication technologies;

FIG. 8 is a schematic diagram of a structure of a broadcast message according to an embodiment of this application;

DESCRIPTION OF EMBODIMENTS

The following describes technical solutions in embodiments of the present invention with reference to accompanying drawings. It is clearly that the described embodiments are merely some rather than all of embodiments of this specification.

In the descriptions of this specification, "an embodiment", "some embodiments", or the like indicates that one or more embodiments of this specification include a specific feature, structure, or characteristic described with reference to the embodiments. Therefore, statements such as "in one embodiment", "in some embodiments", "in some other embodiments", and "in still some other embodiments" that appear at different places in this specification do not necessarily refer to a same embodiment, but mean "one or more but not all embodiments", unless otherwise specially emphasized in another manner.

In the descriptions of this specification, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions of embodiments of this specification, "a plurality of" means two or more than two.

In the descriptions of this specification, the terms "first" and "second" are merely intended for description, and shall not be understood as an indication or implication of relative importance or implicit indication of a quantity of indicated technical features. Therefore, a feature limited by "first" or "second" may explicitly or implicitly include one or more features. The terms "include", "contain", "have", and their variants all mean "include but are not limited to", unless otherwise specifically emphasized in another manner.

Figure 1:
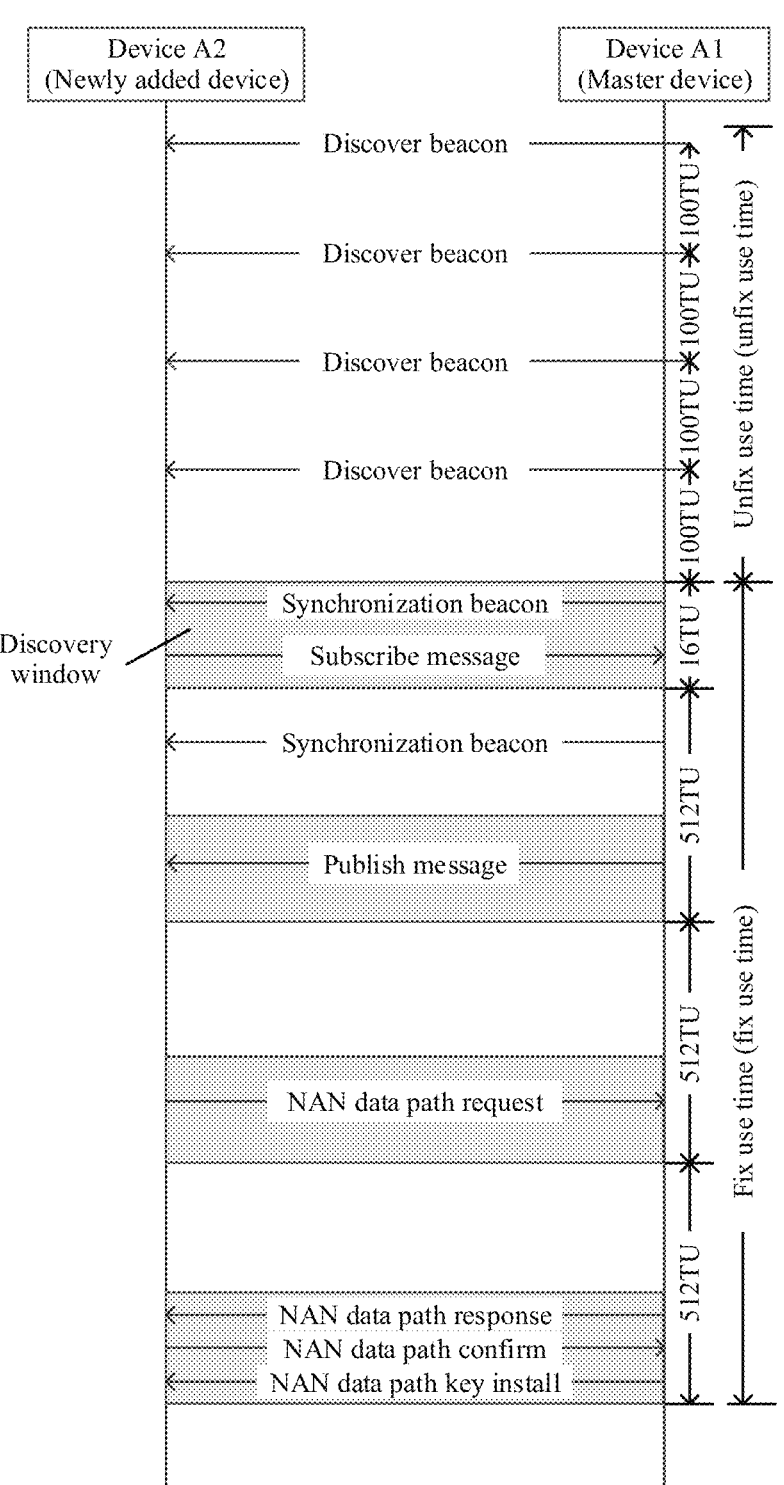
FIG. 1 is a flowchart of establishing a Wi-Fi link.

FIG. 1 shows a Wi-Fi data path establishment solution. A Wi-Fi data path may also be referred to as a Wi-Fi link.

In the solution shown in FIG. 1, Wi-Fi data path establishment between devices may be classified into device discovery, service subscribe/publish, and key exchange. Details are as follows:

Refer to FIG. 1. A Wi-Fi NAN may include a plurality of devices including a device A1. The device A1 may serve as a master device, and another device in the Wi-Fi NAN may be referred to as a slave device. For energy saving, the slave device is in a sleep state most of the time, and wakes up only when a discovery window (DW) arrives, to establish the Wi-Fi data path between the devices. The master device may be continuously in an awake state, and may periodically broadcast a discover beacon, for example, may broadcast a discover beacon once every 100 time units (TUs). Usually, 1 TU=1024 μs. The discover beacon may carry arrival time of the discovery window, so that a device (for example, a device A2) that is newly added to the Wi-Fi NAN can wake up at the same time as another device in the Wi-Fi NAN. This helps establish the Wi-Fi data path between the devices.

Specifically, as shown in FIG. 1, the device in the Wi-Fi NAN has a discovery window whose duration is 16 TUs every 512 time units. When the discovery window arrives, the device in the Wi-Fi NAN wakes up from a sleep state. The device (for example, the device A1) in the awake state may broadcast a synchronization beacon on a specific channel (for example, a channel 6 on a 2.4 GHz channel) through a Wi-Fi interface. The device (for example, the device A2) in the awake state may obtain, through listening, the synchronization beacon on the specific channel through the Wi-Fi interface. In this way, device discovery can be implemented.

After obtaining the synchronization beacon through listening, the device A2 may broadcast a subscribe message, and actively search for a device that matches a service corresponding to the subscribe message. The device (for example, the device A1) that matches the subscribe message may send a publish message to the device A2. In this way, service subscribe/publish can be implemented.

Device discovery is implemented between the device A2 and the device A1. After service subscribe/publish, the device A2 and the device A1 may sequentially exchange information such as an NAN data path request (NDP Request), an NAN data path response (NDP Response), an NAN data path confirm (NDP Confirm), and an NAN data path key install (NDP Key Install). In this way, a Wi-Fi NAN data path between the device A2 and the device A1 is established.

In the solution shown in FIG. 1, establishment of the Wi-Fi NAN data path needs to consume relatively much power and time.

There is a solution that may implement device discovery and service subscribe/publish by using a Bluetooth low energy (BLE) technology. Bluetooth low energy is an ultra-low power consumption near field communication solution for a mobile terminal launched by a Bluetooth special interest group (Bluetooth SIG) in 2016. Refer to FIG. 2. Operating power consumption of the BLE communication technology is far lower than operating power consumption of a Wi-Fi communication technology. Because the BLE communication technology features low power consumption and a low throughput, the BLE communication technology may be usually used for mutual discovery between mobile devices. However, the Wi-Fi communication technology features a high throughput and high power consumption. Therefore, in this solution, a point-to-point device is scanned and discovered by using the BLE communication technology. Then, a Wi-Fi communication connection is established and data communication is performed. Details may be shown in FIG. 3.

Figure 3:
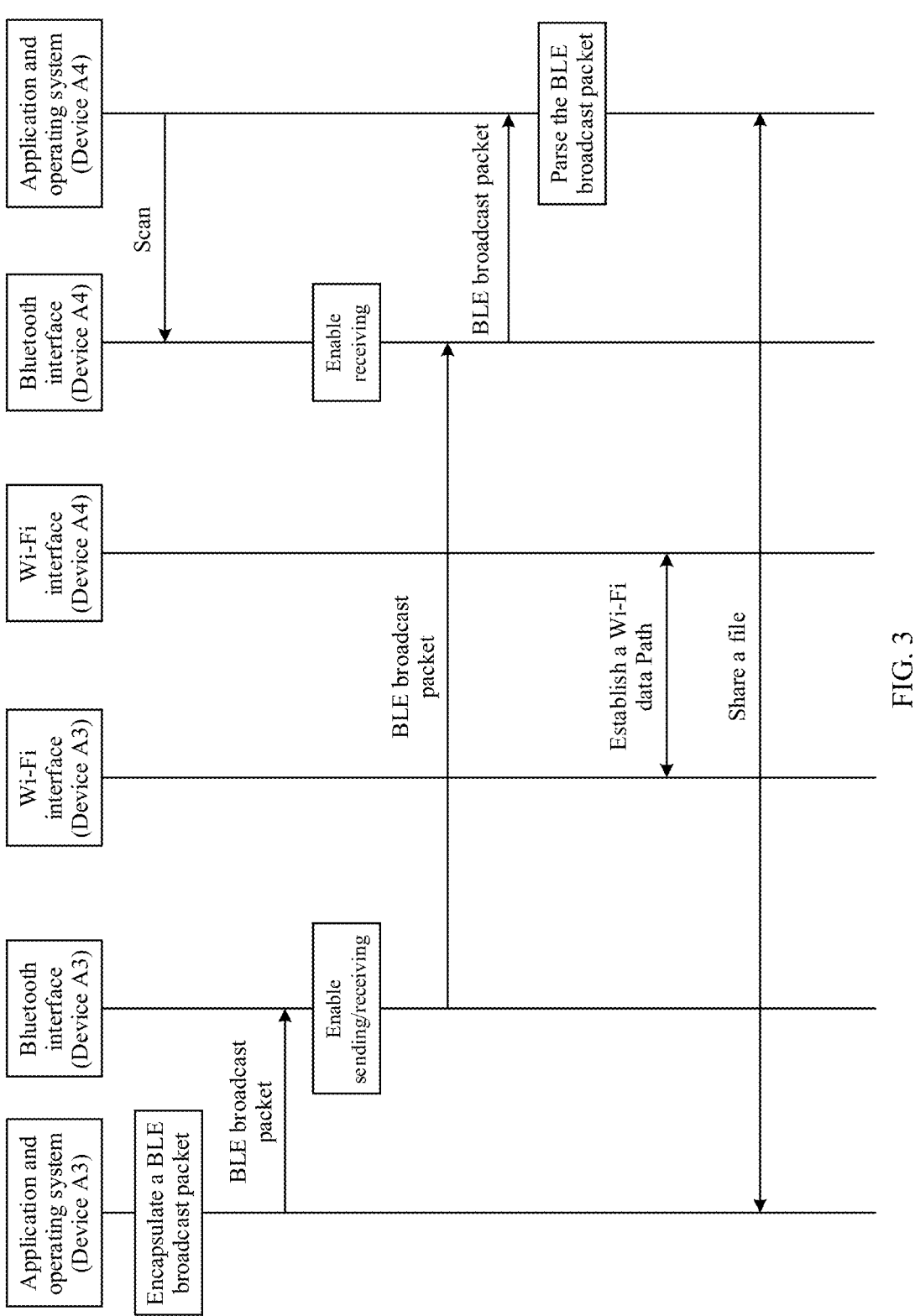
FIG. 3 is another flowchart of establishing a Wi-Fi link.

FIG. 3 shows a process in which a device A3 establishes a Wi-Fi communication connection to a device A4 to share a file. Specifically, the device A3 may open a file sharing interface in respond to an operation of a user. An internal operating system of the device A3 is responsible for encapsulating a BLE broadcast packet. The BLE broadcast packet includes fields such as a vendor ID (identifier), a service identifier (service ID), and a user ID. The BLE broadcast packet is broadcast through a Bluetooth air interface. The device A4 may scan the BLE broadcast packet and parse the packet. If the device A4 can match the fields such as the vendor ID, the service ID, and the user ID, the device A4 may establish a Wi-Fi data path to the device A3, and use a file sharing service based on the Wi-Fi communication technology. For establishment of a Wi-Fi data path between the device A4 and the device A3, refer to the solution shown in FIG. 1.

In the solution shown in FIG. 3, because the operating power consumption of the BLE communication technology is far lower than the operating power consumption of the Wi-Fi communication technology, device discovery and service subscribe/publish are performed by using the BLE, so that broadcasting and scanning may be performed at a higher frequency. A device discovery delay is reduced. Therefore, compared with the solution shown in FIG. 1, the solution shown in FIG. 3 can reduce the device discovery delay.

In both the solution shown in FIG. 1 and the solution shown in FIG. 3, a Wi-Fi connection between devices is implemented when a target device (that is, a device that receives a NAN data path request) has a quantity of available connections. However, due to a limitation on a concurrent processing capability of a central processing unit (CPU) and firmware of the device, and a quantity of point-to-point communication virtual interfaces provided by the device is also limited. In other words, a quantity of devices to which the device is directly connected through Wi-Fi is limited. For example, a mobile phone running an Android® (Android®) system may simultaneously perform Wi-Fi connections to a maximum of two other devices, that is, a maximum quantity of connections of the Android mobile phone is 2. With popularization of smart home interconnection applications, the quantity of devices that need to be interconnected and interworked at the same time increases. The foregoing two solutions do not provide how to establish a Wi-Fi connection when a quantity of connected devices reaches the maximum.

This embodiment of this application provides a neighborhood aware network-based device connection method, and the method may be performed by a device that supports a wireless-fidelity neighborhood aware network (Wi-Fi NAN) protocol. A device that performs the method may be referred to as a scanning device. The scanning device may receive a plurality of broadcast messages of a plurality of devices, and the plurality of devices are in a one-to-one correspondence with the plurality of broadcast messages. Any one of the plurality of broadcast messages may include Wi-Fi connection information of a corresponding device and connected device information of the corresponding device. The Wi-Fi connection information is used to represent a quantity of Wi-Fi connections of the device, and the connected device information is used to represent a device to which the device is connected through Wi-Fi. The scanning device may determine a target device from the plurality of devices based on an operation of a user. Alternatively, when broadcast information includes a service identifier, the scanning device may determine the target device based on the service identifier. A specific solution for determining the target device is described below. Details are not described herein again. The target device is a device to which the scanning device is intended to connect through Wi-Fi. When the scanning device cannot or is inconvenient to establish a direct Wi-Fi connection between the scanning device and the target device (for example, a quantity of available Wi-Fi connections of the target device is not greater than 0), the scanning device may determine a relay device from connected devices of the target device, to establish a multi-hop Wi-Fi connection between the scanning device and the target device by using the relay device. Therefore, when the scanning device cannot or is inconvenient to establish the direct Wi-Fi connection between the scanning device and the target device, the scanning device can quickly determine the relay device, and establish the multi-hop Wi-Fi connection to the target device by using the relay device. This improves device use experience of a user.

Figure 4A:
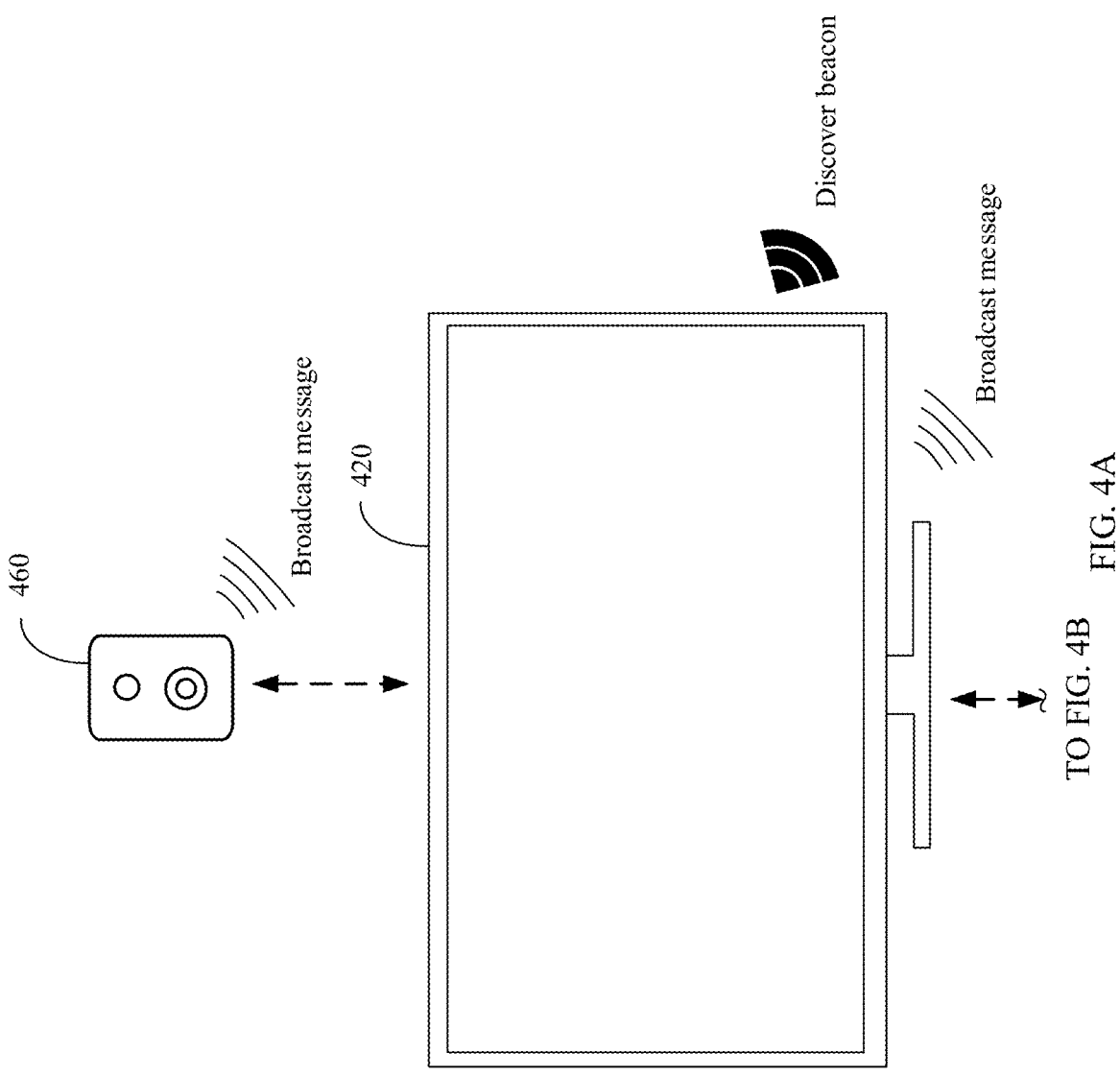
FIG. 4A and FIG. 4B are a schematic diagram of a network system.
Figure 4B:
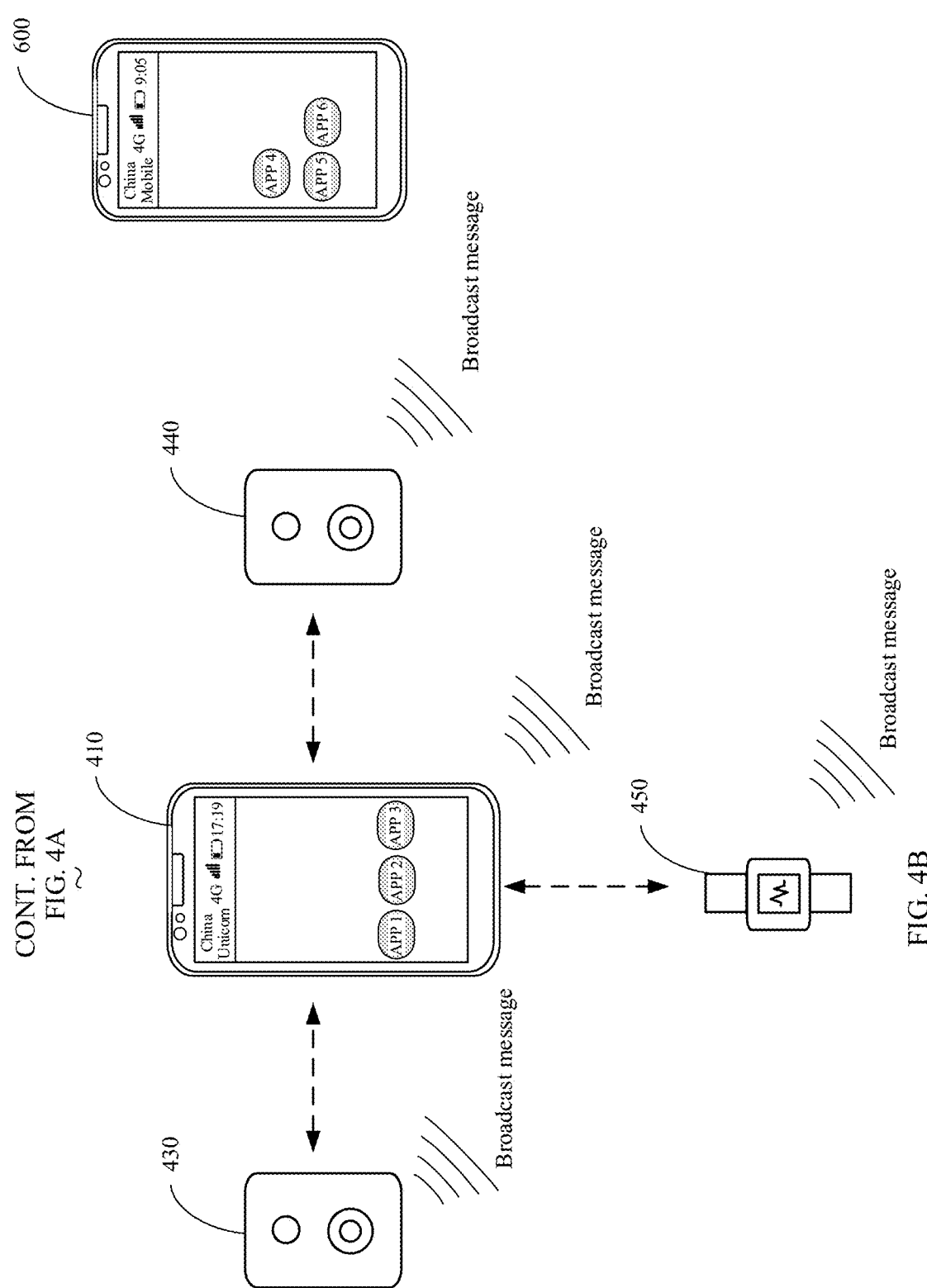

FIG. 4A and FIG. 4B show a neighborhood aware network system. The network system may include a device 410, a device 420, a device 430, a device 440, a device 450, and a device 460.

The device 410, the device 420, the device 430, the device 440, the device 450, and the device 460 are devices that support a wireless-fidelity neighborhood aware network (Wi-Fi NAN) protocol. In some embodiments, any one of the device 410, the device 420, the device 430, the device 440, the device 450, and the device 460 may be a mobile phone that supports the Wi-Fi NAN protocol, a tablet computer that supports the Wi-Fi NAN protocol, a smart TV that supports the Wi-Fi NAN protocol, a smart wearable device (for example, a smartwatch) that supports the Wi-Fi NAN protocol, a vehicle-mounted communication device that supports the Wi-Fi NAN protocol, a personal computer (PC) that supports the Wi-Fi NAN protocol, an air conditioner that supports the Wi-Fi NAN protocol, a speaker that supports the Wi-Fi NAN protocol, and the like. In an example, as shown in FIG. 4B, the device 410 may be a mobile phone that supports the Wi-Fi NAN protocol. The device 420 may be a smart TV that supports the Wi-Fi NAN protocol. The device 430, the device 440, and the device 460 may be speakers that support the Wi-Fi NAN protocol. The device 450 may be a smartwatch that supports the Wi-Fi NAN protocol.

One of the device 410, the device 420, the device 430, the device 440, the device 450, and the device 460 may be a master device. For example, as shown in FIG. 4A and FIG. 4B, it may be set that in the device 410, the device 420, the device 430, the device 440, the device 450, and the device 460, the device 420 serves as the master device in a Wi-Fi NAN by election. The master device may periodically broadcast a discover beacon, so that a newly added device can synchronize a discovery window (DW) with another device in the network system.

Any one of the device 410, the device 420, the device 430, the device 440, the device 450, and the device 460 supports Wi-Fi, and may be connected to another device through Wi-Fi. Specifically, as shown in FIG. 4A and FIG. 4B, the device 410 may be directly connected to the device 420 through Wi-Fi, the device 410 may be directly connected to the device 430 through Wi-Fi, the device 410 may be directly connected to the device 440 through Wi-Fi, the device 410 may be directly connected to the device 450 through Wi-Fi, and the device 420 may be directly connected to the device 460 through Wi-Fi.

Figure 5:
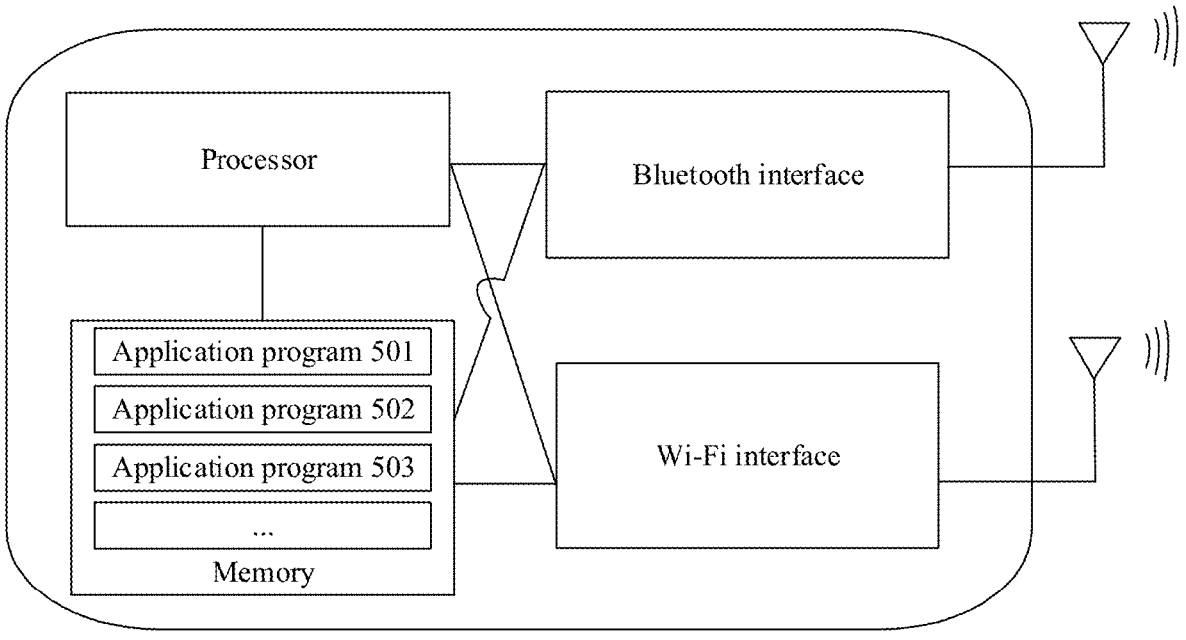
FIG. 5 is a schematic diagram of a structure of a device that supports a Wi-Fi NAN protocol.

Refer to FIG. 5. In some embodiments, some or one of the device 410, the device 420, the device 430, the device 440, the device 450, and the device 460 may include a processor, a memory, or a Wi-Fi interface. One of the device 410, the device 420, the device 430, the device 440, the device 450, and the device 460 may perform a Wi-Fi connection to the another device through the Wi-Fi interface. The memory of the device may store a plurality of application programs such as an application program 501, an application program 502, and an application program 503. The processor of the device may invoke one or more application programs stored in the memory, to send data to the another device through the Wi-Fi interface, or process data received from the another device through the Wi-Fi interface.

Back to FIG. 4A and FIG. 4B, a device in the device 410, the device 420, the device 430, the device 440, the device 450, and the device 460 may send a broadcast message. The device 410 is used as an example. A broadcast message of the device 410 may include Wi-Fi connection information of the device 410 and connected device information of the device 410. The Wi-Fi connection information of the device 410 may be used to represent a quantity of Wi-Fi connections of the device 410. A connected device of the device 410 refers to a device to which the device 410 is currently connected. Based on the Wi-Fi connection information of the device 410 and the connected device information of the device 410, when determining that the device 410 has no available Wi-Fi virtual interface, a device that is intended to connect to the device 410 may use the connected device of the device 410 as a relay device, to establish a multi-hop Wi-Fi link between the device that is intended to connect to the device 410 and the device 410. Therefore, a Wi-Fi connection between the device that is intended to connect to the device 410 and the device 410 is implemented.

For example, any device may include a Bluetooth interface. Any device may send the broadcast message through the Bluetooth interface. In other words, the broadcast message may be a Bluetooth broadcast frame, to reduce power consumption for sending the broadcast message.

For example, any device may periodically send the broadcast message. Duration of a periodicity may be preset based on experience or an experiment. Details are not described herein again.

The broadcast message is specifically described below. Details are not described herein again.

Back to FIG. 4B, the network system may further include a device 600 that supports the Wi-Fi NAN protocol. For example, the device 600 is a mobile phone that supports the Wi-Fi NAN protocol, a tablet computer that supports the Wi-Fi NAN protocol, a smart TV that supports the Wi-Fi NAN protocol, a smart wearable device (for example, a smartwatch) that supports the Wi-Fi NAN protocol, a vehicle-mounted communication device that supports the Wi-Fi NAN protocol, a personal computer (PC) that supports the Wi-Fi NAN protocol, an air conditioner that supports the Wi-Fi NAN protocol, or a speaker that supports the Wi-Fi NAN protocol.

The device 600 may obtain the discover beacon through listening, to synchronize the discovery window with other devices shown in FIG. 4A and FIG. 4B. The device 600 may obtain a broadcast message sent by one or more of the device 410, the device 420, the device 430, the device 440, the device 450, and the device 460 through listening, to establish a Wi-Fi link to at least one of the one or more devices. Details are described below and not described herein again.

In some embodiments, a hardware structure of the device 600 may be shown in FIG. 5. For details, refer to the foregoing descriptions of the embodiment shown in FIG. 5. Details are not described herein again.

Figure 6:
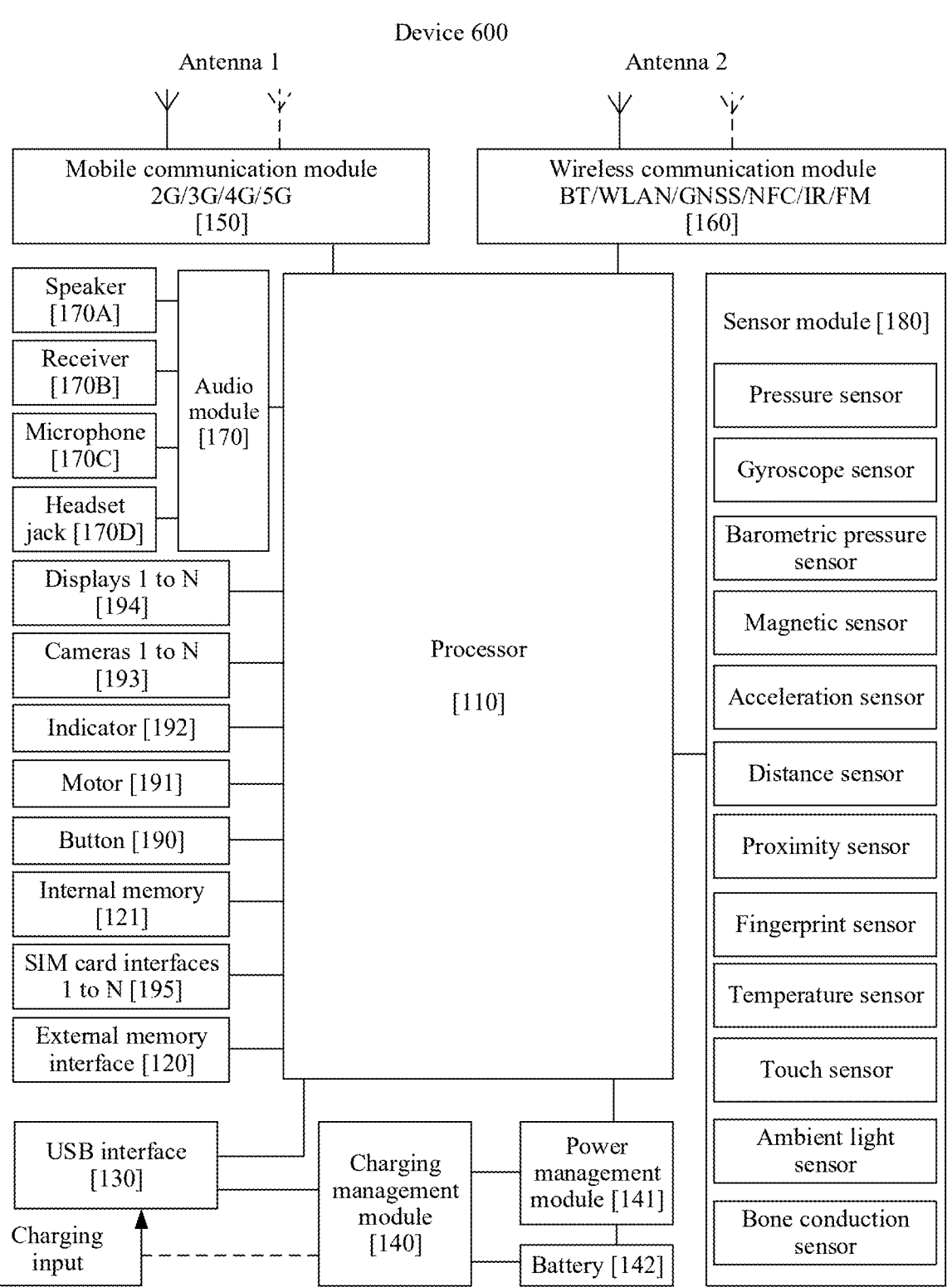
FIG. 6 is a schematic diagram of a structure of a device that supports a Wi-Fi NAN protocol.

In some embodiments, the hardware structure of the device 600 may be shown in FIG. 6. The device 600 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It can be understood that the structure shown in this embodiment of the present invention does not constitute a specific limitation on the device 600. In some other embodiments of this application, the device 600 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the device 600. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a USB interface, and/or the like.

The charging management module 140 is configured to receive a charging input from a charger. The charger may be a wireless charger or a wired charger. The charging management module 140 may further supply power to an electronic device by using the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like. In some other embodiments, the power management module 141 may alternatively be disposed in the processor 110. In some other embodiments, the power management module 141 and the charging management module 140 may alternatively be disposed in a same component.

A wireless communication function of the device 600 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. The mobile communication module 150 can provide a solution to wireless communication that is applied to the device 600 and that includes 2G/3G/4G/5G or the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some function modules in the mobile communication module 150 may be disposed in the processor 110. In some embodiments, at least some function modules in the mobile communication module 150 may be disposed in a same device as at least some modules in the processor 110.

The wireless communication module 160 may provide a wireless communication solution that is applied to the device 600 and that includes a wireless local area network (WLAN) (for example, Wi-Fi network), Bluetooth (BT), a global navigation satellite system (GNSS), frequency modulation (FM), a near field communication (NFC) technology, an infrared (IR) technology, or the like. In some embodiments, Bluetooth may be Bluetooth low energy (BLE).

The wireless communication module 160 may be one or more components integrating at least one communication processor module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In this embodiment of this application, the wireless communication module 160 may support the Wi-Fi NAN. The device 600 may receive, by using the wireless communication module 160, the discover beacon sent by the master device in the Wi-Fi NAN, to learn arrival time of a discovery window of the Wi-Fi NAN, so that the device 600 wakes up when the discovery window arrives, and exchanges information with another device in the Wi-Fi NAN through the Wi-Fi interface. The wireless communication module 160 may further receive a broadcast message sent by another device in the Wi-Fi NAN, and determine a target device and a relay device based on the broadcast message.

The device 600 may implement a display function through the GPU, the display 194, the application processor, and the like. The GPU is a microprocessor for image processing, and is connected to the display 194 and the application processor. The display 194 is configured to display an image, a video, and the like. The display 194 includes a display panel. The display panel may be an LCD, an OLED, an AMOLED, an FLED, a mini-LED, a micro-LED, a micro-OLED, a QLED, or the like. In some embodiments, the device 600 may include one or N displays 194, where N is a positive integer greater than 1.

The device 600 may implement a photographing function by using the ISP, the camera 193, the video codec, the GPU, the display 194, the application processor, and the like. The device 600 may implement audio functions such as music playing and recording by using the audio module 170, the speaker 170A, the receiver 170B, the microphone 170C, the headset jack 170D, the application processor, and the like. The button 190 includes a power button, a volume button, and the like. The button 190 may be a mechanical button, or may be a touch button. The motor 191 may generate a vibration prompt. The motor 191 may be configured to provide an incoming call vibration prompt and a touch vibration feedback. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with or separation from the device 600. The device 600 may support one or N SIM card interfaces, where N is a positive integer greater than 1. The device 600 interacts with a network through the SIM card, to implement functions such as calling and data communication.

Figure 7A:
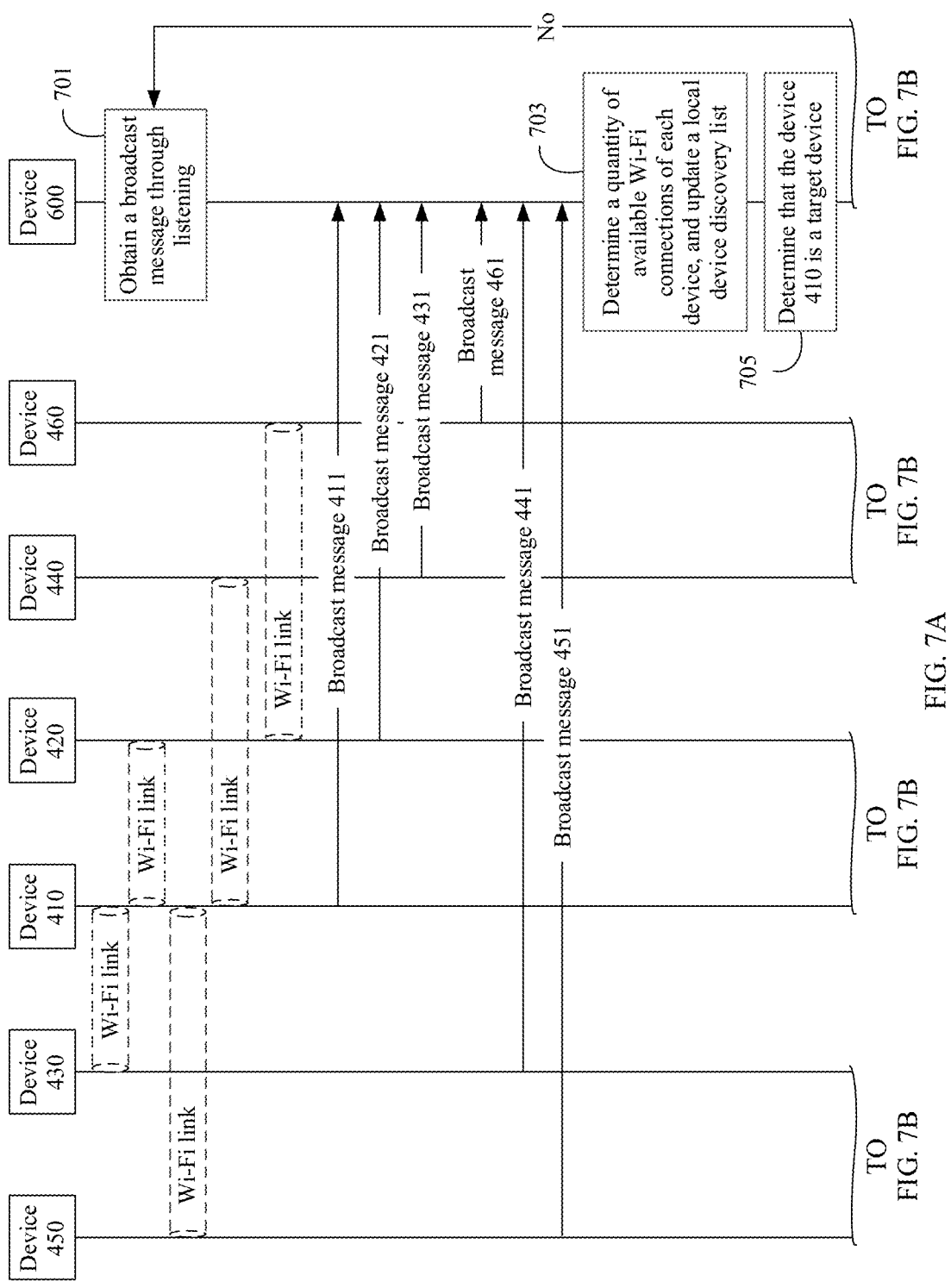
FIG. 7A, FIG. 7B, and FIG. 7C are a flowchart of a neighborhood aware network-based device connection method according to an embodiment of this application.
Figure 7B:
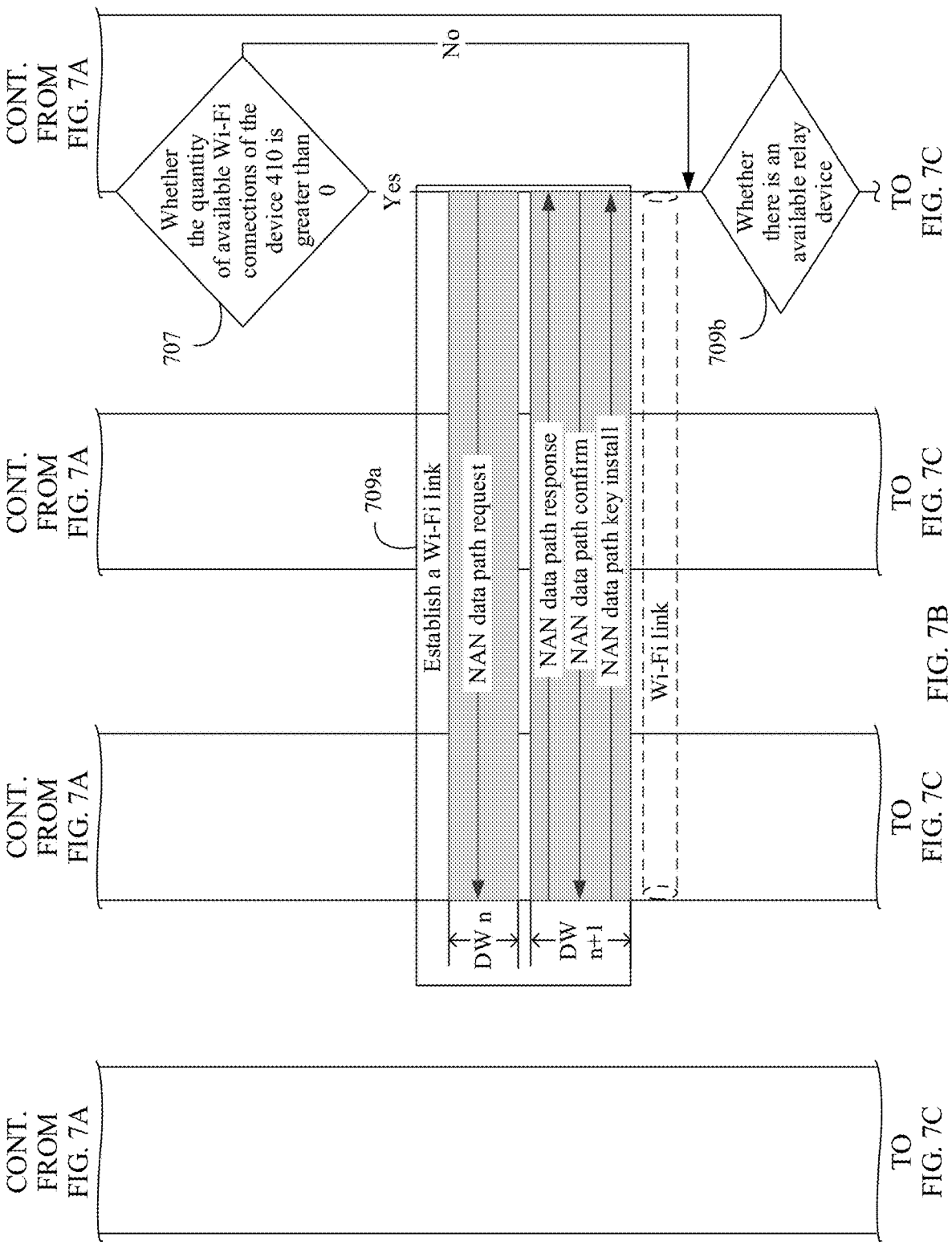
Figure 7C:
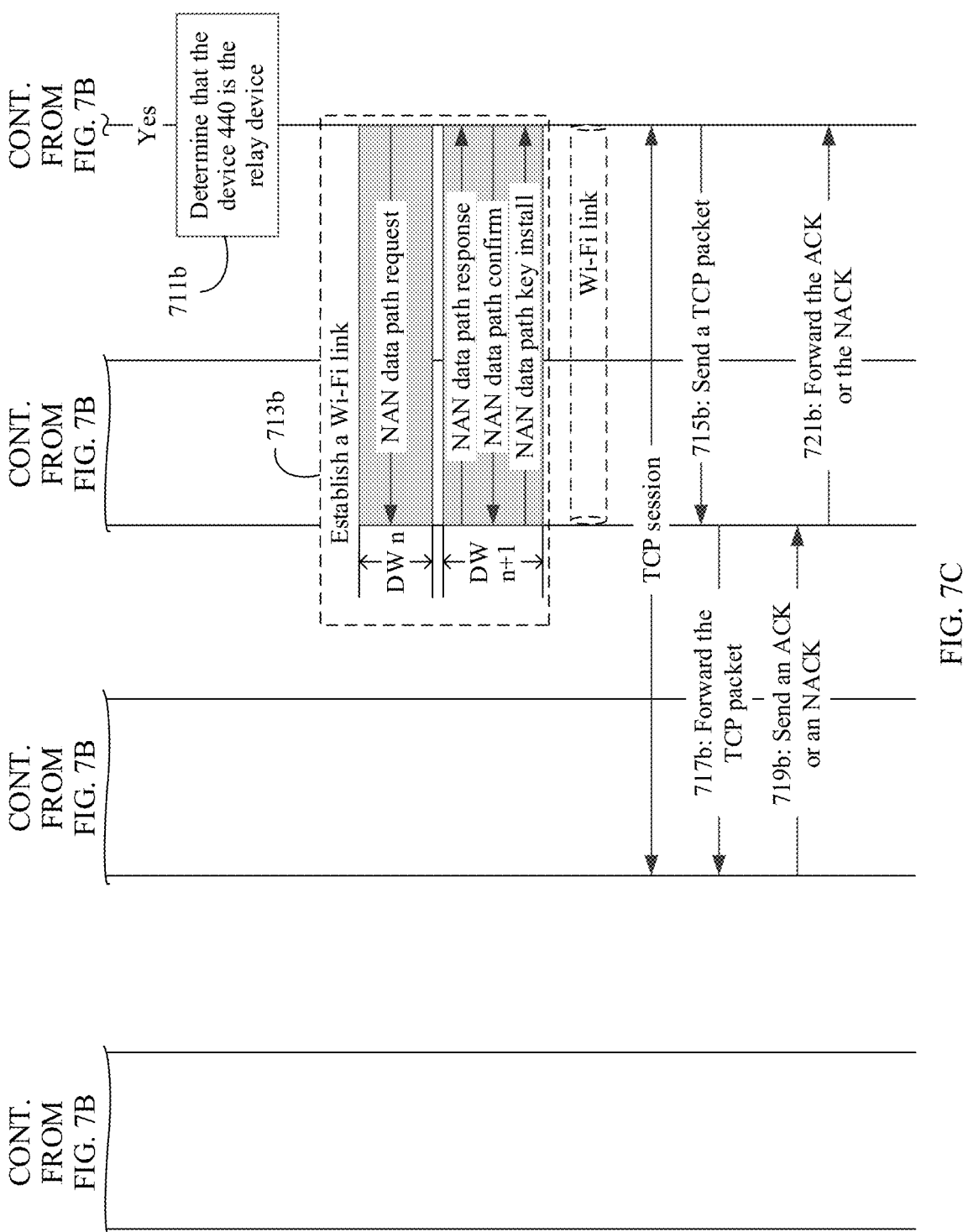

With reference to FIG. 7A, FIG. 7B, and FIG. 7C, the following uses the network system shown in FIG. 4A and FIG. 4B as an example to describe a neighborhood aware network-based device connection method provided in an embodiment of this application.

Refer to FIG. 7A, FIG. 7B, and FIG. 7C and FIG. 4A and FIG. 4B. There is a Wi-Fi link between the device 410 and the device 420, there is a Wi-Fi link between the device 410 and the device 430, there is a Wi-Fi link between the device 410 and the device 440, and there is a Wi-Fi link between the device 410 and the device 450. The device 420, the device 430, the device 440, and the device 450 may be referred to as connected devices of the device 410.

In some embodiments, it may be understood that the device 410 may directly communicate with the device 420 through the Wi-Fi link between the device 410 and the device 420. Therefore, the device 420 may be referred to as a direct Wi-Fi connection device of the device 410. Similarly, the device 430, the device 440, and the device 450 may also be referred to as direct Wi-Fi connection devices of the device 410. For ease of description, the direct Wi-Fi connection device of the device 410 may be referred to as a one-hop neighbor of the device 410. It may be understood that the one-hop neighbor of the device 410 may alternatively be directly connected to another device (a device other than the device 410) through Wi-Fi, and the another device may be referred to as a two-hop neighbor of the device 410. For example, with reference to FIG. 4A and FIG. 4B, the device 420 is directly connected to the device 460 through Wi-Fi, and the device 420 is a one-hop neighbor of the device 410, so that the device 460 may be referred to as the two-hop neighbor of the device 410. In other words, a device other than the device 410 in the devices to which the one-hop neighbor of the device 410 is directly connected through Wi-Fi may be referred to as the two-hop neighbor of the device 410. By analogy, a device other than an n−1-hop neighbor of the device 410 in the devices to which an n-hop neighbor of the device 410 is directly connected through Wi-Fi may be referred to as an n+1-hop neighbor of the device 410.

In some embodiments, the one-hop neighbor of the device 410 may be referred to as the connected device of the device 410. In other words, in this embodiment, the connected device of the device 410 refers to the one-hop neighbor of the device 410 by default. The device 410 may record a process of establishing a Wi-Fi link between the device 410 and the one-hop neighbor, and may obtain, through listening, a heartbeat packet sent by the one-hop neighbor of the device 410, so as to determine that a connection is maintained between the device 410 and the one-hop neighbor of the device 410.

In some embodiments, each device in the one-hop to n-hop neighbors of the device 410 may be referred to as the connected device of the device 410. For example, the device 410 may determine, by using a heartbeat packet between the device 410 and the connected device of the device 410, that a Wi-Fi connection is maintained between the device 410 and the connected device of the device 410. The heartbeat packet may be a transmission control protocol (TCP) heartbeat packet, or may be a user datagram protocol (UDP). The device 410 may determine, based on a quantity of output ports through which the heartbeat packet received by the device 410 passes, a quantity of neighbor hops of a device sending the heartbeat packet relative to the device 410. For example, if a quantity of output ports through which one heartbeat packet received by the device 410 passes is 2, it may be determined that the device sending the heartbeat packet is the two-hop neighbor of the device 410.

For a connected device of another device, refer to the foregoing descriptions of the connected device of the device 410. Details are not described herein again.

In FIG. 7A, the device 410 may send a broadcast message 411. For example, the device 410 may periodically send the broadcast message 411. Duration of a periodicity may be preset based on experience or an experiment, for example, may be set to 100 time units. For example, the broadcast message 411 may be a Bluetooth broadcast frame. In other words, the device 410 may send the broadcast message 411 through the Bluetooth interface, so that power consumption for broadcasting can be reduced.

In some embodiments, connected device information of the device 410 is used to represent the one-hop neighbor of the device 410. The connected device information of the device 410 may include device information of the one-hop neighbor of the device 410. Specifically, the connected device information of the device 410 may include information about the device 420, the device 430, the device 440, and the device 450. The one-hop neighbor of the device 410 may send device information of the one-hop neighbor of the device 410 to the device 410, so that the device 410 carries the device information of the one-hop neighbor of the device 410 in the broadcast message 411.

In an illustrative example of this embodiment, a device represented by the connected device information of the device 410 is the one-hop neighbor of the device 410 by default. When the scanning device obtains the broadcast information through scanning, a device represented by the connected device information may be the one-hop neighbor of the device 410 by default. In an example, when the device 410 is designed or produced, the broadcast message of the device 410 may be set to carry only the connected device information used to represent the one-hop neighbor of the device 410. When the scanning device 600 is designed or produced, a device represented by the connected device information in the broadcast message obtained by the scanning device 600 through scanning may be set to a one-hop neighbor of a corresponding device.

In an illustrative example of this embodiment, the connected device information of the device 410 further includes a quantity of neighbor hops. The quantity of neighbor hops is 1, and is used to indicate that the device represented by the connected device information is the one-hop neighbor of the device 410.

As described above, the device 410 may determine, based on a quantity of output ports of the heartbeat packet received by the device 410, a quantity of neighbor hops corresponding to a device sending the heartbeat packet. For example, if a quantity of output ports through which one heartbeat packet received by the device 410 passes is 2, it may be determined that the device sending the heartbeat packet is the two-hop neighbor of the device 410. In other words, for the device 410, the quantity of neighbor hops corresponding to the device sending the heartbeat packet is 2.

In some embodiments, the connected device information of the device 410 may be used to represent information about each neighbor in the one-hop to n-hop neighbors of the device 410. N≥1. The connected device information of the device 410 may include device information of each device in the one-hop to n-hop neighbors of the device 410. Each device in the one-hop to n-hop neighbors of the device 410 may send device information of each device to the device 410, so that the device 410 may obtain the device information of each device in the one-hop to n-hop neighbors of the device 410, and add the device information to the broadcast message 411. In this embodiment, the connected device information of the device 410 may further include a quantity of neighbor hops corresponding to each device in the one-hop to n-hop neighbors of the device 410. The quantity of neighbor hops of the device corresponds to the device information of the device, and is used to indicate that which hop of neighbors of the device 410 is the device. For example, a quantity of neighbor hops corresponding to device information of the device 420 is 1. This indicates that the device 420 is the one-hop neighbor of the device 410. For another example, a quantity of neighbor hops corresponding to device information of the device 460 is 2. This indicates that the device 460 is the two-hop neighbor of the device 410. As described above, the device 410 may determine, based on a quantity of output ports of the heartbeat packet received by the device 410, a quantity of neighbor hops corresponding to a device sending the heartbeat packet. For example, if a quantity of output ports through which one heartbeat packet received by the device 410 passes is 2, it may be determined that the device sending the heartbeat packet is the two-hop neighbor of the device 410. In other words, for the device 410, the quantity of neighbor hops corresponding to the device sending the heartbeat packet is 2.

In some embodiments, as shown in FIG. 8, the connected device information may be a media access control (MAC) address of the connected device.

Refer to FIG. 8. The broadcast message 411 may include the connected device information of the device 410. The Wi-Fi connection information refers to information that can be used to determine whether the device 410 has a quantity of available Wi-Fi connections. The quantity of available Wi-Fi connections may also be referred to as a quantity of available Wi-Fi virtual interfaces, and indicates whether the device can be further directly connected to a new device through Wi-Fi. In other words, the quantity of available Wi-Fi connections of the device indicates whether a one-hop neighbor of the device can be added. If the quantity of available Wi-Fi connections of the device 410 is not greater than 0, that is, the quantity of available Wi-Fi connections of the device 410 is 0, the device 410 has reached an upper limit of Wi-Fi connections, and a one-hop neighbor of the device 410 cannot be added. If the quantity of available Wi-Fi connections of the device 410 is greater than 0, the device 410 may be further directly connected to a new device through Wi-Fi, that is, a one-hop neighbor of the device 410 may be added. For example, if the quantity of available Wi-Fi connections of the device 410 is 1, the device 410 may be further directly connected to a new device through Wi-Fi, that is, a one-hop neighbor may be further added to the device 410.

In some embodiments, the Wi-Fi connection information of the device 410 may be a maximum quantity of Wi-Fi connections of the device 410. The maximum quantity of Wi-Fi connections of the device 410 refers to a maximum quantity of devices to which the device 410 can be directly connected through Wi-Fi at the same time. In other words, the maximum quantity of Wi-Fi connections of the device 410 refers to a maximum quantity of one-hop neighbors of the device 410.

In an example, if a maximum quantity of Wi-Fi connections of the device 410 is 4, at a same moment, the device 410 is directly connected to a maximum of four devices through Wi-Fi. When the device 410 is directly connected to four devices through Wi-Fi, a quantity of available connections of the device 410 is 0. In other words, when there are 4 one-hop neighbors (for the device 410, devices whose quantity of neighbor hops is 1) of the device 410, the quantity of available connections of the device 410 is 0.

In some embodiments, the Wi-Fi connection information of the device 410 may be a quantity of available Wi-Fi connections of the device 410. The device 410 may determine the quantity of available connections of the device 410 based on a quantity of one-hop neighbors of the device 410 and the maximum quantity of Wi-Fi connections of the device 410. Specifically, the quantity of available Wi-Fi connections may be obtained by subtracting the quantity of one-hop neighbors from the maximum quantity of Wi-Fi connections.

The broadcast message 411 may further include device information of the device 410. In some embodiments, as shown in FIG. 8, the device information of the device 410 may include a MAC address of the device 410.

In some embodiments, the broadcast message 411 may include device identifier information of the device 410.

For example, the device identifier information may include a device name, for example, "HUAWEI Mate 30".

For example, the device identifier information may include a user identifier corresponding to the device. For example, when the device is a mobile phone, the user identifier may be a mobile phone number corresponding to the mobile phone, that is, a mobile subscriber international ISDN/PSTN number (MSISDN) corresponding to the mobile phone. For example, when the device is a Huawei® device, the user identifier corresponding to the device may be a nickname set by the user in an "Account Center", a bound email address, or the like.

For example, the device identifier information may include a device type. For example, when the device is a mobile phone, the device type may be a "mobile phone". When the device is a large-screen device, the device type may be a "large-screen device". When the device is a speaker, the device type may be a "speaker".

In some embodiments, as shown in FIG. 8, the broadcast message 411 may further include one or more service identifiers (service IDs). The service identifier is used to identify a service, and the service may be a service such as a file transfer service, an audio decoding service, or a video decoding service. Correspondingly, a service identifier used to identify a file transfer service is referred to as a file transfer service identifier, a service identifier used to identify an audio decoding service is referred to as an audio decoding service identifier, and a service identifier used to identify a video decoding service is referred to as a video decoding service identifier. The service identifier in the broadcast message 411 is used to identify a service that can be provided by the device 410. For example, if the broadcast message 411 includes a file transfer service identifier, it indicates that the device 410 can provide a file transfer service.

For example, a service corresponding to the service identifier carried in the broadcast message 411 may be a service provided by invoking, by the device 410, an application program or enabling a function of the device 410. Next, an example is provided for description.

Figure 9A:
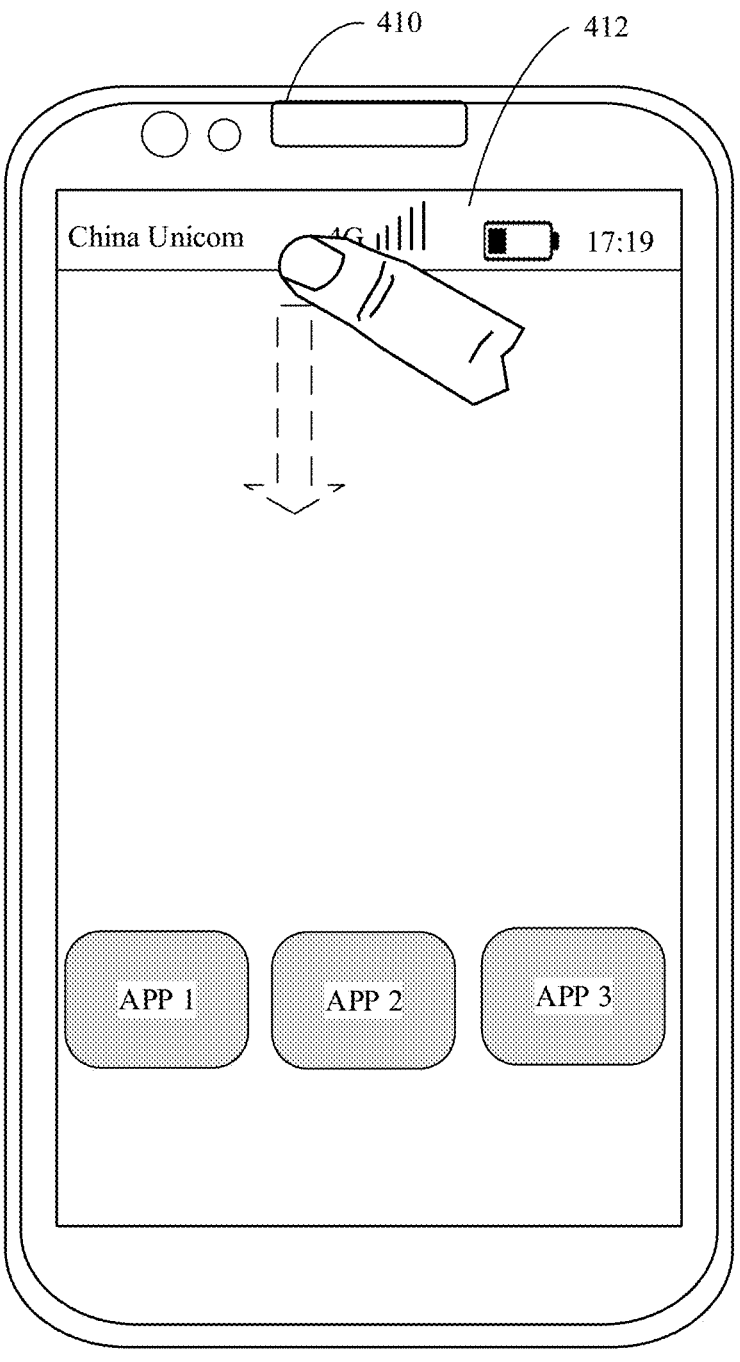
FIG. 9A is a schematic diagram of a user interface according to an embodiment of this application.
Figure 9B:
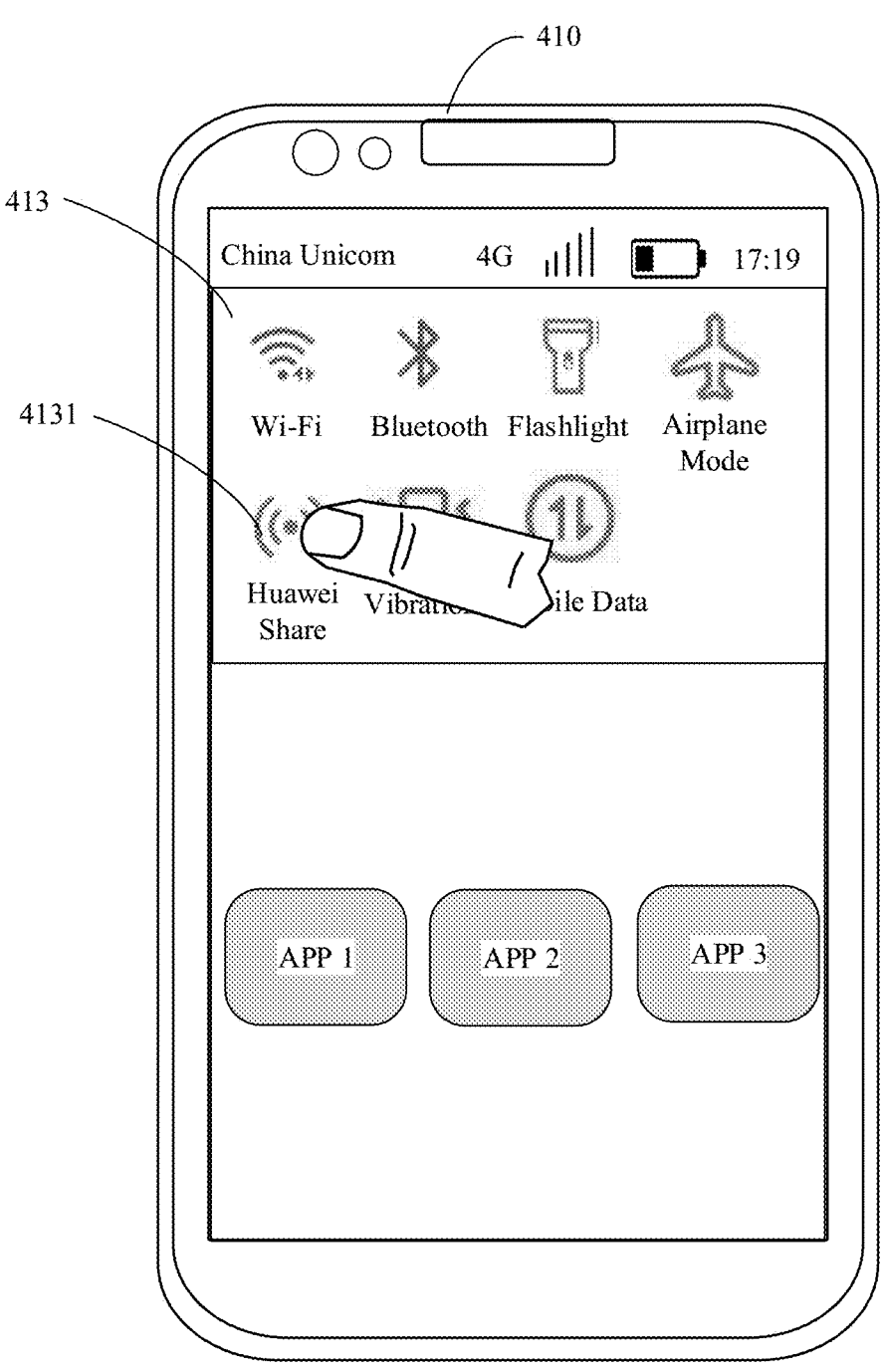
FIG. 9B is a schematic diagram of a user interface according to an embodiment of this application.
Figure 9C:
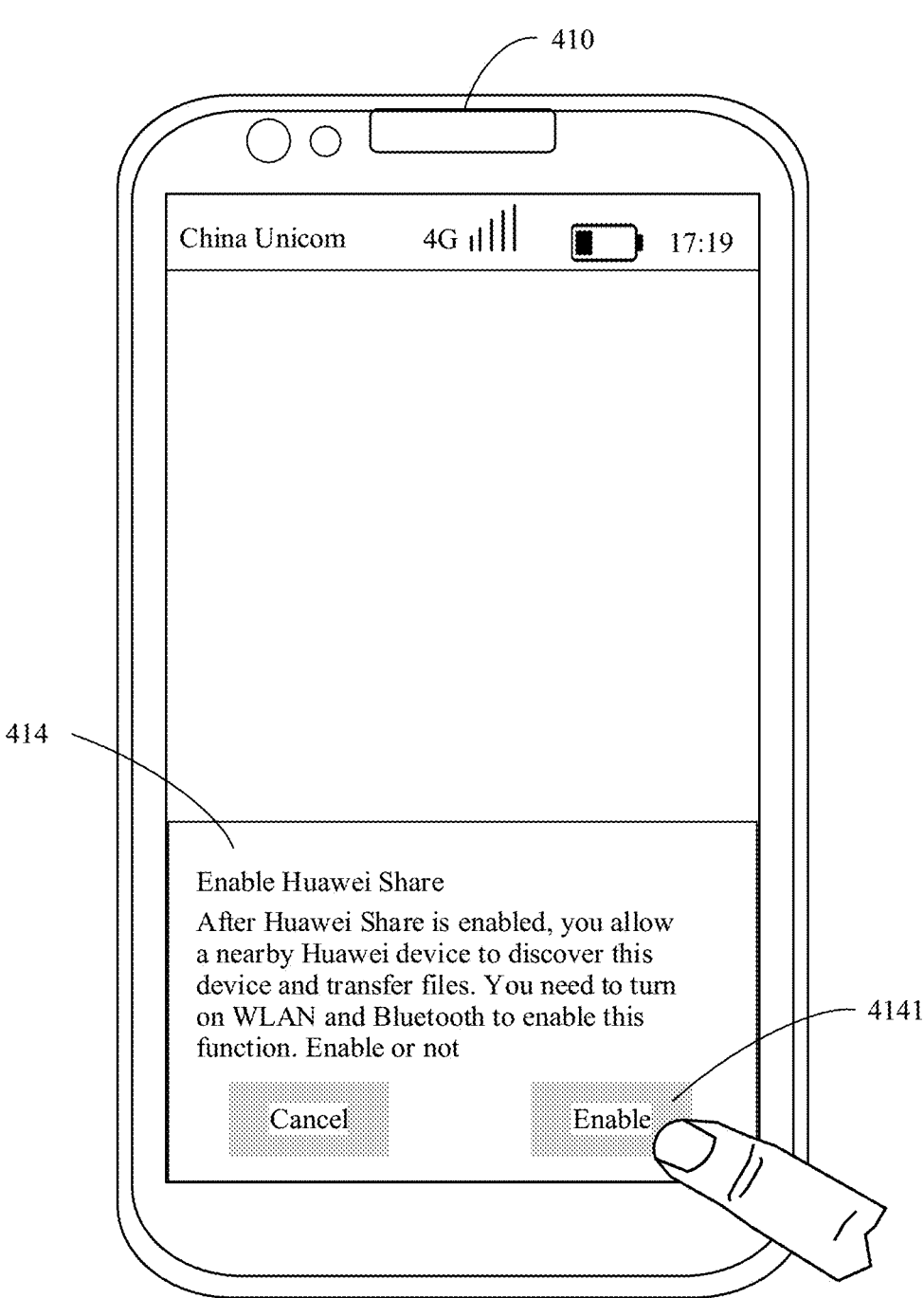
FIG. 9C is a schematic diagram of a user interface according to an embodiment of this application.

In an illustrative example, the file transfer service may be a service provided by invoking a file sharing function by the device 410. In an example, the file sharing function may be a "Huawei Share" function. Before sending the broadcast message 411, the device 410 may enable the "Huawei Share" function. For details, refer to FIG. 9A to FIG. 9C. As shown in FIG. 9A, the device 410 may display an extended function window 413 in response to a slide-down operation for a status bar 412. The extended function window 413 may include a "Huawei Share" icon 4131. The device 410 may display a prompt window 414 in response to an operation for the "Huawei Share" icon 4131. The prompt window 414 may prompt the user to enable "Huawei Share", to allow another device to discover the device 410 and perform file transfer. The prompt window 414 may include an "Enable" icon 4141. The device 410 may enable the "Huawei Share" function in response to an operation for the "Enable" icon 4141.

After the device 410 enables the "Huawei Share" function, the broadcast message 411 sent by the device 410 may include the file transfer service identifier.

The device 420 may send a broadcast message 421. The broadcast message 421 may include Wi-Fi connection information of the device 420, connected device information of the device 420, and the like. For details, refer to the foregoing descriptions of the Wi-Fi connection information of the device 410 and the connected device information of the device 410. Details are not described herein again.

In some embodiments, the broadcast message 421 may include one or more service identifiers.

In an example, the one or more service identifiers may include an audio decoding service identifier and a video decoding service identifier. In other words, in this example, the device 420 may provide an audio decoding service and a video decoding service. In an example, the audio decoding service and the video decoding service may be services provided by invoking a projection application program by the device 420.

Figure 10A:
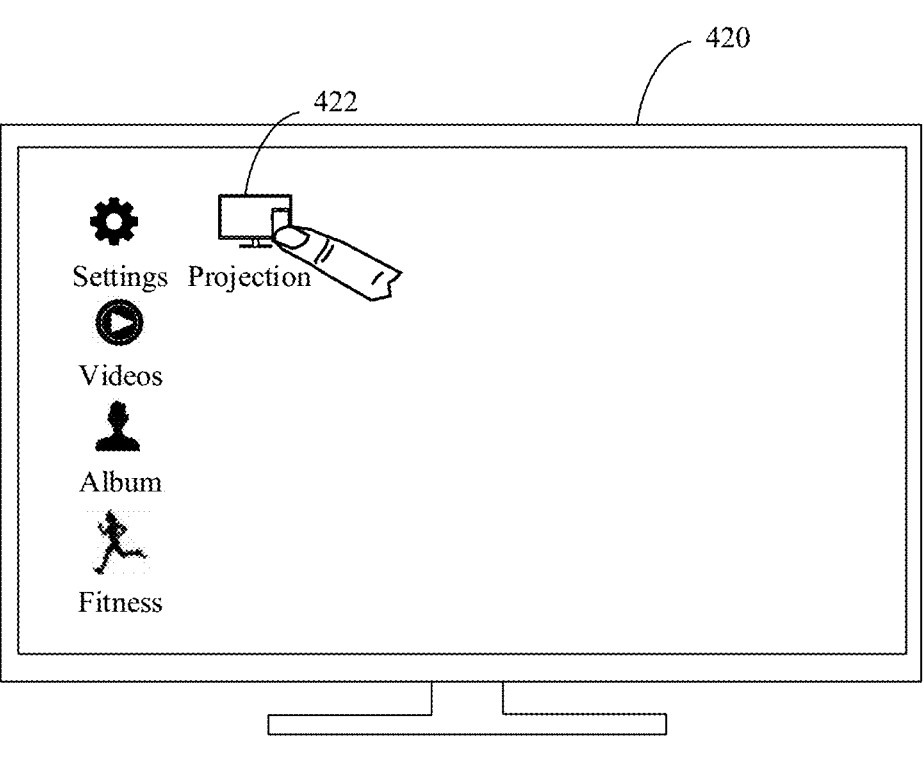
FIG. 10A is a schematic diagram of a user interface according to an embodiment of this application.
Figure 10B:
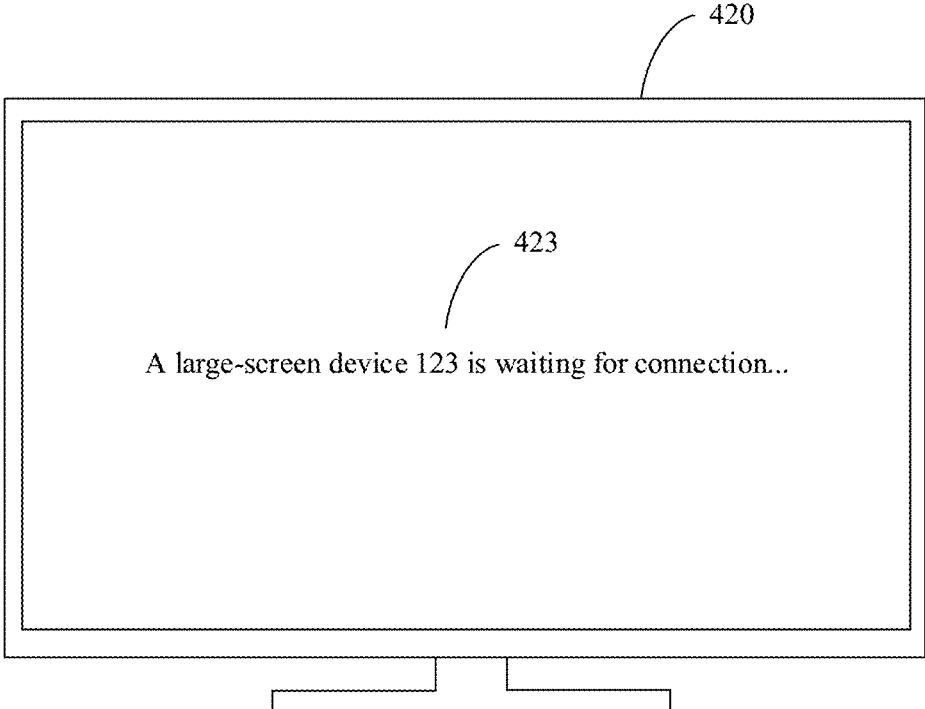
FIG. 10B is a schematic diagram of a user interface according to an embodiment of this application.

Refer to FIG. 10A and FIG. 10B. The device 420 may run the projection application in response to an operation for a projection application 422. After the projection application is enabled, the device 420 may display prompt information 423 "A large-screen device 123 is waiting for connection . . . " to prompt that the device 420 is waiting for another device to connect, to perform projection. "Large-screen device 123" is a device name of the device 420.

After the device 420 enables the projection application, the broadcast message 421 sent by the device 420 may include the audio decoding service identifier and the video decoding service identifier.

In some embodiments, the broadcast message 421 may further include other information. For details, refer to the foregoing descriptions of the broadcast message 411. Details are not described herein again.

It should be noted that the foregoing describes a service provided by invoking, by the device 410 and the device 420 in a manner of manual enabling by a user, an application program or enabling a function. In other embodiments, the device 410 and the device 420 may further provide a service by invoking, in a default enabling manner, an application program or enabling a function. Specifically, the application program or the function used to provide a service by the device may be automatically enabled as the device is powered on. Especially for home devices such as a smartwatch, a smart speaker, a smart refrigerator, and a smart air conditioner, a related function or application program may be enabled in a default enabling manner, so that the home devices can be actively discovered by another device.

The device 430 may send a broadcast message 431, the device 440 may send a broadcast message 441, the device 450 may send a broadcast message 451, and the device 460 may send a broadcast message 461. For details, refer to the foregoing descriptions of sending the broadcast message 411 by the device 410 and sending the broadcast message 421 by the device 420. Details are not described herein again.

Still refer to FIG. 7A. The device 600 may serve as a scanning device to perform step 701 of obtaining a broadcast message through listening.

The device 600 may obtain the broadcast message through listening in a manner of scanning a channel. For example, as described above, a broadcast message sent by the another device is a Bluetooth broadcast frame. The device 600 may scan a Bluetooth common channel through the Bluetooth interface. The Bluetooth common channel is usually a channel 37, a channel 38, or a channel 39. The device 600 may scan one or more of the channel 37, the channel 38, and the channel 39 according to a Bluetooth-related protocol.

In some embodiments, the device 600 may automatically scan a channel in a default enabling manner. In other words, the device 600 may automatically scan the channel as the device 600 is powered on.

In some embodiments, the device 600 may scan the channel in a manual enabling manner. Next, an example is provided for description with reference to a specific scenario.

Figure 11A:
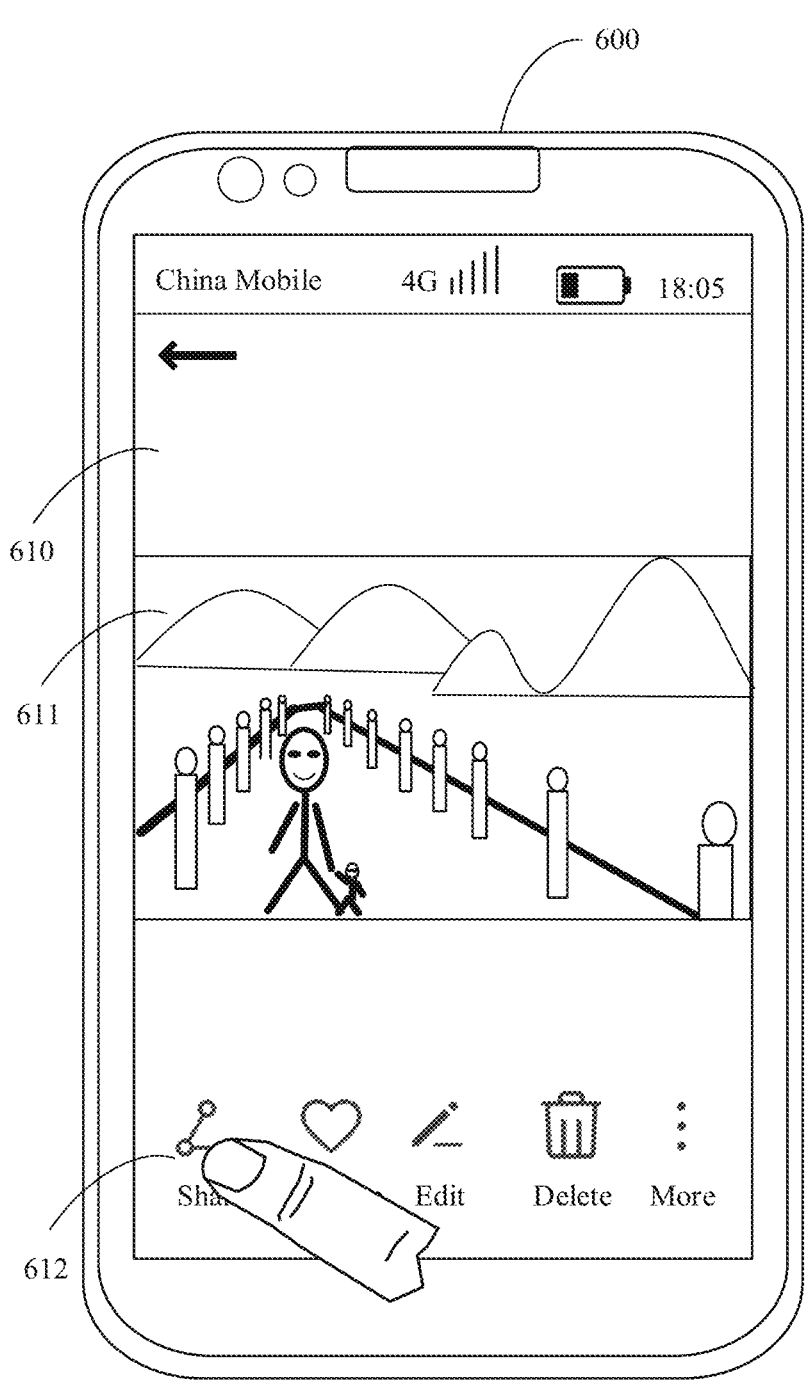
FIG. 11A is a schematic diagram of a user interface according to an embodiment of this application.
Figure 11B:
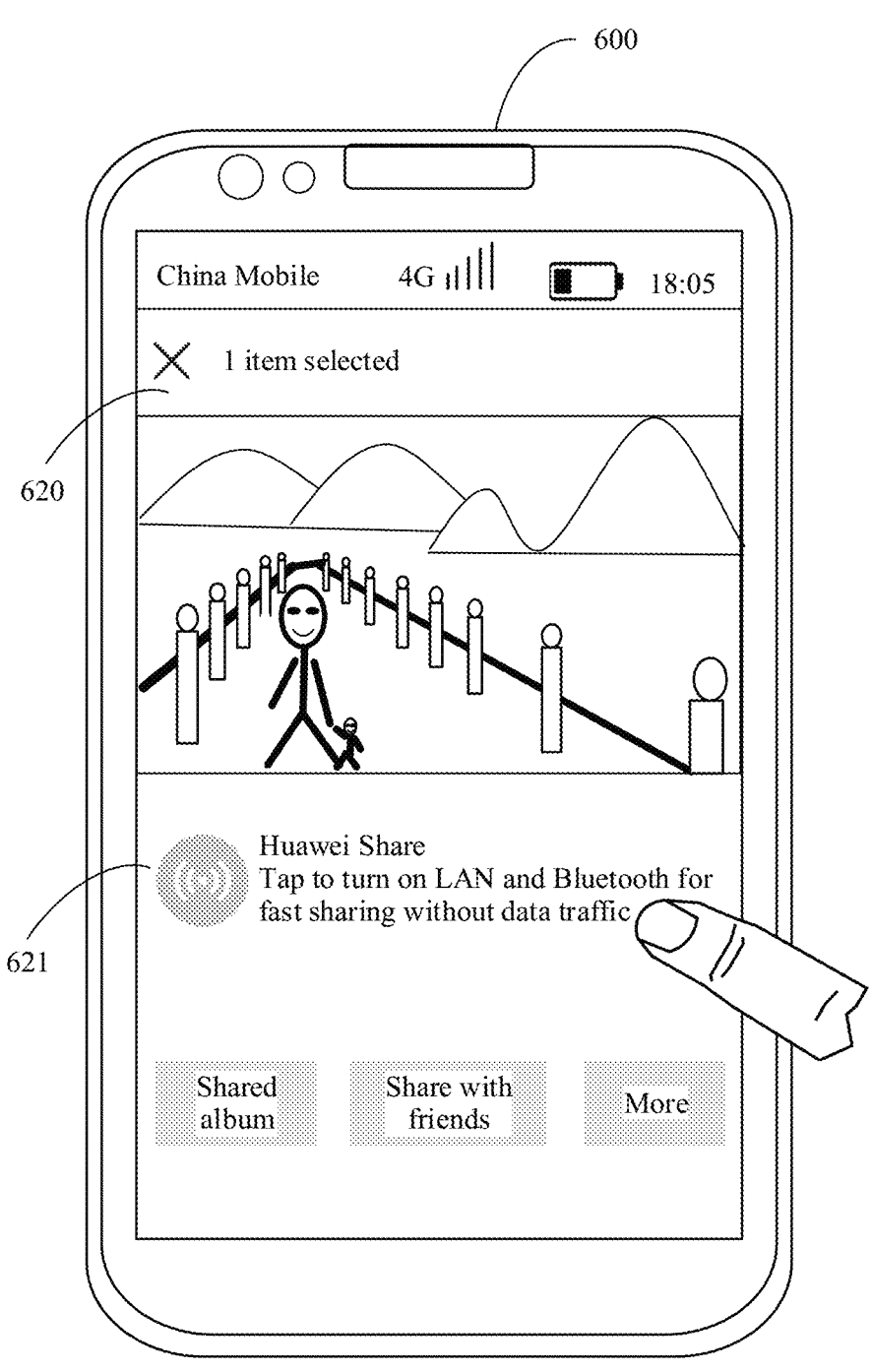
FIG. 11B is a schematic diagram of a user interface according to an embodiment of this application.
Figure 11C:
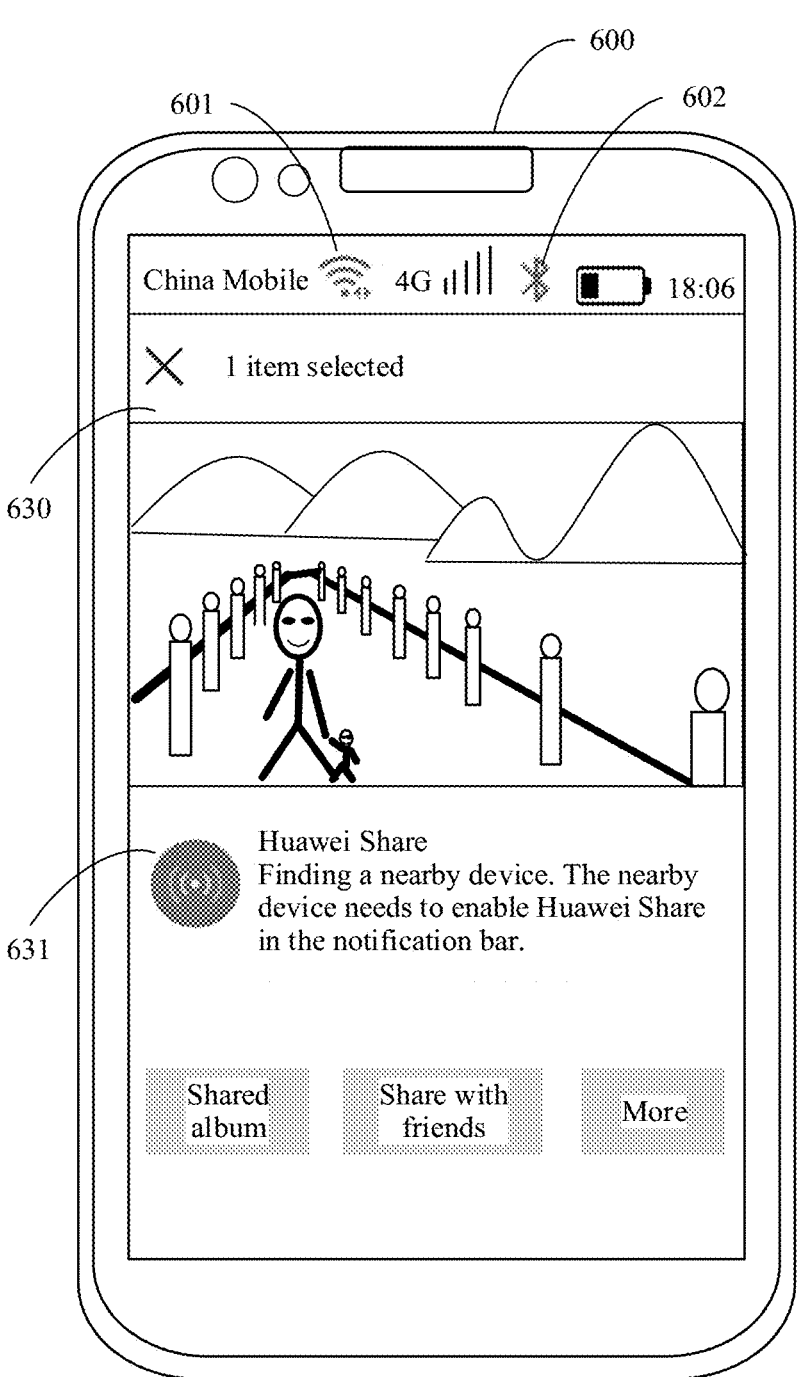
FIG. 11C is a schematic diagram of a user interface according to an embodiment of this application.

In an illustrative example, the device 600 may scan the channel by invoking the "Huawei Share" function in an image sharing scenario. Refer to FIG. 11A. The device 600 may display an interface 610. The interface 610 may include an image 611 and a sharing function area 612. For example, with reference to FIG. 11B, if the device 600 does not enable the Wi-Fi function and the Bluetooth function, the device 600 may display an interface 620 in response to an operation for the sharing function area 612. The interface 620 may include a prompt function area 621. The prompt function area 621 may be used to prompt the user to enable the Wi-Fi function and the Bluetooth function by tapping the prompt function area 621. Refer to FIG. 11B and FIG. 11C. The device 600 may enable the Wi-Fi function and the Bluetooth function (as shown in FIG. 11C, a Wi-Fi network icon 601 and a Bluetooth icon 602 may be displayed in a status bar of the device 600) in response to an operation for the prompt function area 621, scan the channel through Bluetooth, and display an interface 630. The interface 630 may include a prompt function area 631. The prompt function area 631 is used to prompt that the device 600 is discovering a nearby device, that is, is scanning the channel.

For example, if the device 600 has enabled the Wi-Fi function and the Bluetooth function, the device 600 may directly display the interface 630 in response to the operation for the sharing function area 612, and scan the channel through Bluetooth, to discover the nearby device.

Figure 12A:
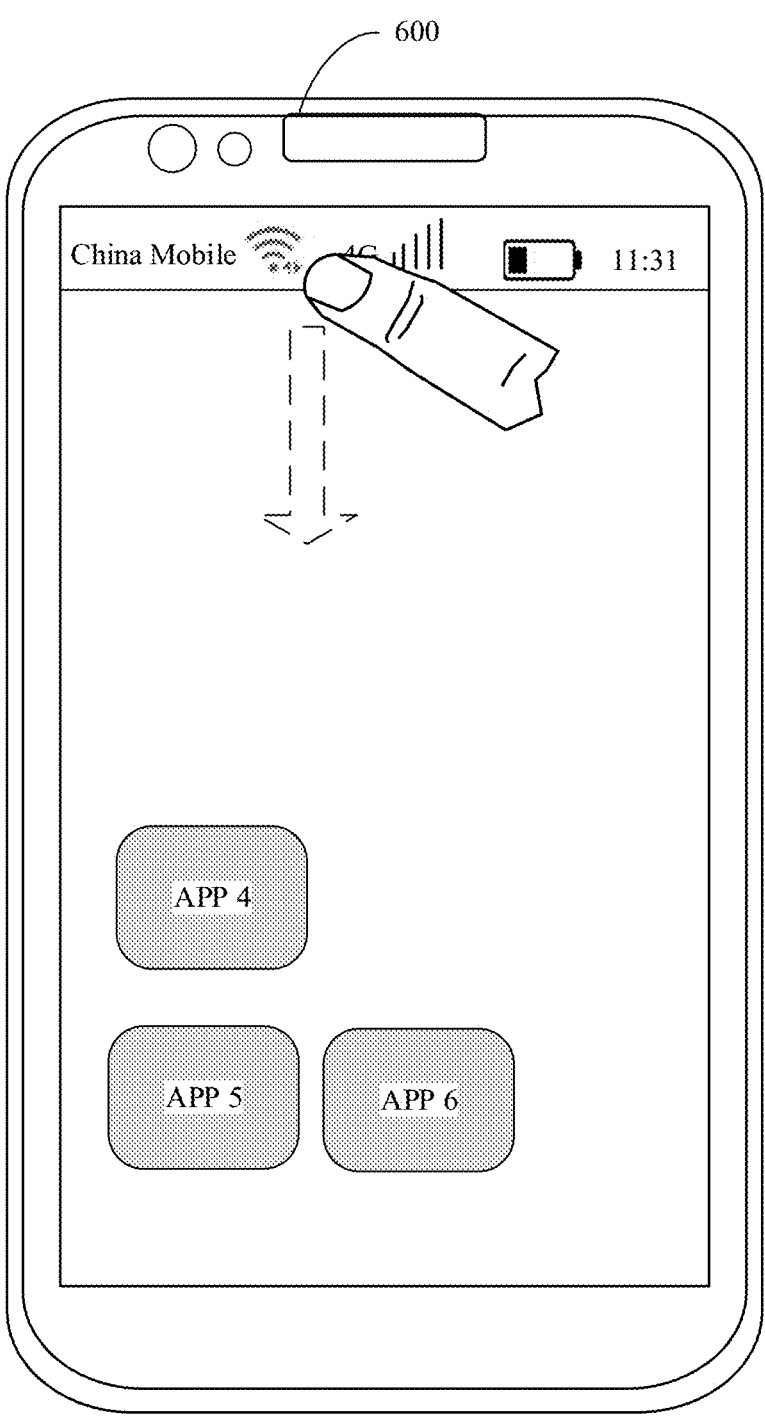
FIG. 12A is a schematic diagram of a user interface according to an embodiment of this application.
Figure 12B:
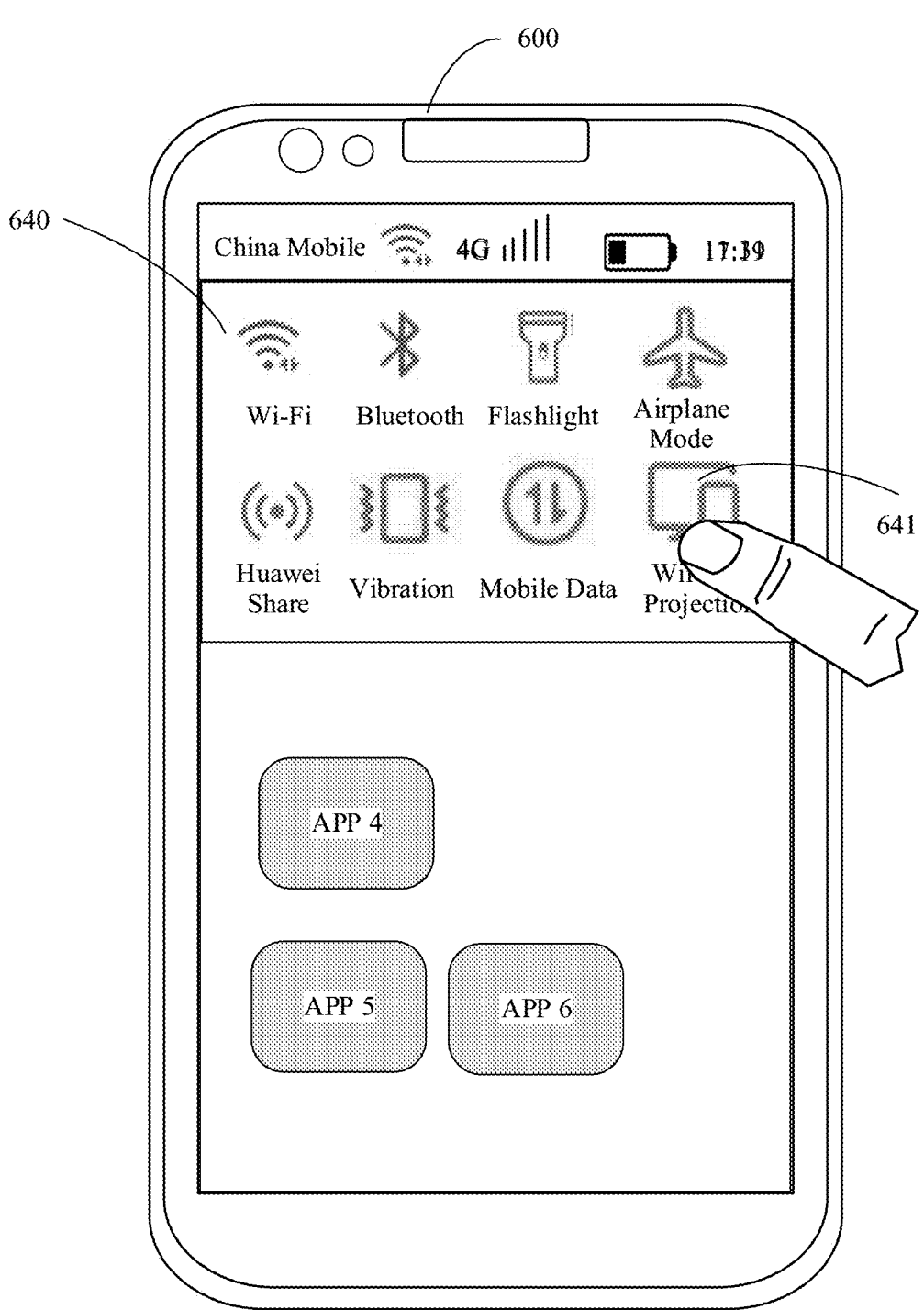
FIG. 12B is a schematic diagram of a user interface according to an embodiment of this application.
Figure 12C:
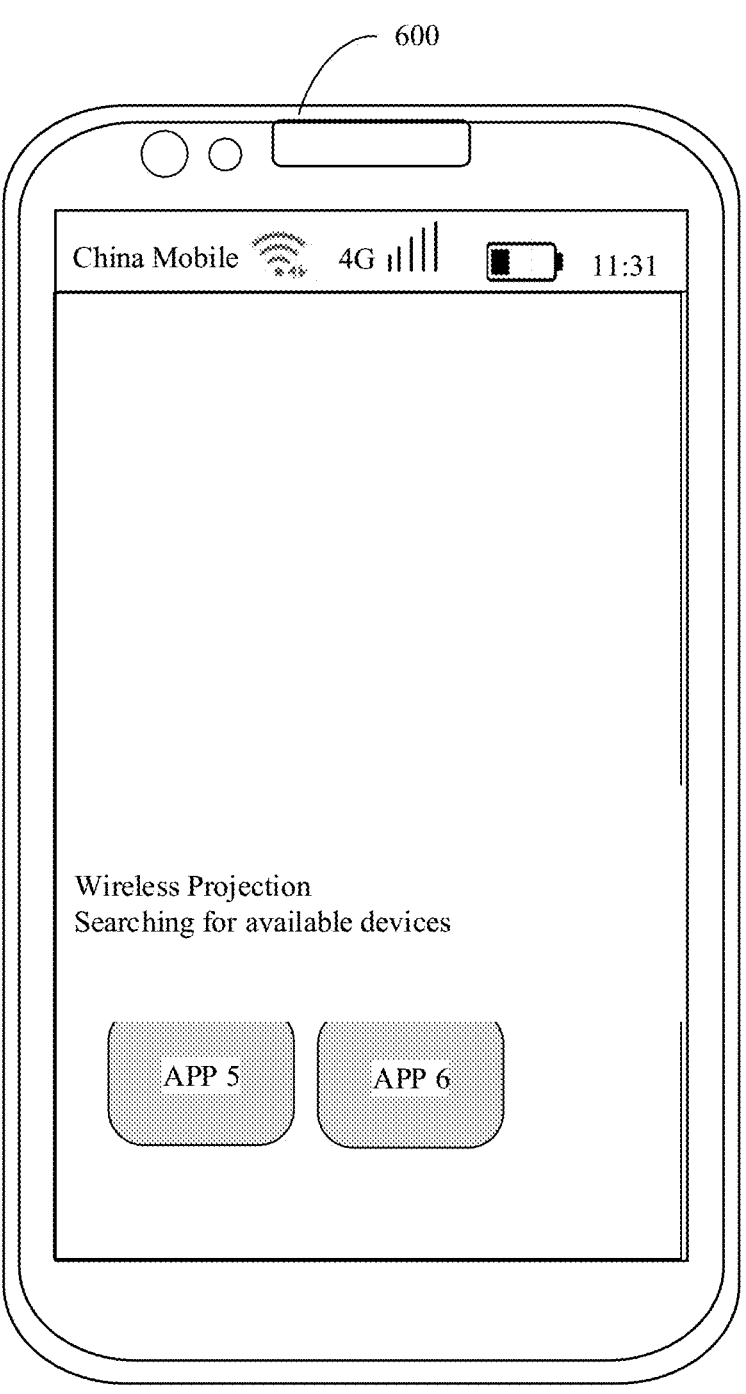
FIG. 12C is a schematic diagram of a user interface according to an embodiment of this application.

In an illustrative example, the device 600 may scan the channel by invoking a "Wireless Projection" function in a projection scenario. Refer to FIG. 12A and FIG. 12B. The device 600 may display an extended window 640 in response to a slide-down operation for a status bar. The extended window 640 may include a wireless projection icon 641. In response to an operation for the wireless projection icon 641, the device 600 may scan the channel and display an interface shown in FIG. 12C, to prompt the user that the device 600 is discovering another device.

According to the foregoing solution, the device 600 may scan the channel, so that the broadcast message 411, the broadcast message 421, the broadcast message 431, the broadcast message 441, the broadcast message 451, and the broadcast message 461 can be obtained through listening.

Next, a solution in which the device 600 establishes a Wi-Fi connection to another device by using an obtained broadcast message is specifically described.

Refer to FIG. 7A. The device 600 may perform step 703 of determining a quantity of available Wi-Fi connections of each device, and updating a local device discovery list.

As described above, the broadcast message includes Wi-Fi connection information of a corresponding device. The device 600 may determine a quantity of available connections of the device based on Wi-Fi connection information of the device. Specifically, an example in which the device 600 determines the quantity of available connections of the device 410 based on the broadcast message 411 is used for description.

For example, Wi-Fi connection information in the broadcast message 411 may include a quantity of available Wi-Fi connections. The device 600 may directly determine that the quantity of available Wi-Fi connections in the broadcast message 411 is the quantity of available Wi-Fi connections of the device 410.

For example, the broadcast message 411 includes the Wi-Fi connection information and connected device information. For details about the connected device information, refer to the foregoing descriptions of the embodiment shown in FIG. 8. Details are not described herein again.

The device 600 may determine a quantity of one-hop neighbors of the device 410 based on the connected device information in the broadcast message 411. For example, as described above, when the connected device information in the broadcast message 411 represents the one-hop neighbor of the device 410 by default, the device 600 may determine that the device represented by the connected device information in the broadcast message 411 is the one-hop neighbor of the device 410. For example, as described above, the connected device information in the broadcast message 411 further includes a quantity of neighbor hops, and the device 600 may determine that a device whose quantity of neighbor hops is 1 is the one-hop neighbor of the device 410.

The Wi-Fi connection information in the broadcast message 411 may include the maximum quantity of Wi-Fi connections of the device 410. The device 600 may subtract the quantity of one-hop neighbors of the device 410 from the maximum quantity of Wi-Fi connections of the device 410, to obtain the quantity of available Wi-Fi connections of the device 410.

A quantity of available connections of the device 420, a quantity of available connections of the device 430, the quantity of available connections of the device 430, a quantity of available connections of the device 450, and a quantity of available connections of the device 460 may be separately determined with reference to a manner of determining the quantity of available connections of the device 410. Details are not described herein again.

A device corresponding to broadcast information received by the device 600 may be referred to as a discovered device of the device 600. The device 600 may have a local device discovery list that may be used to record information about the discovered device of the device 600.

Figures 13, 14:
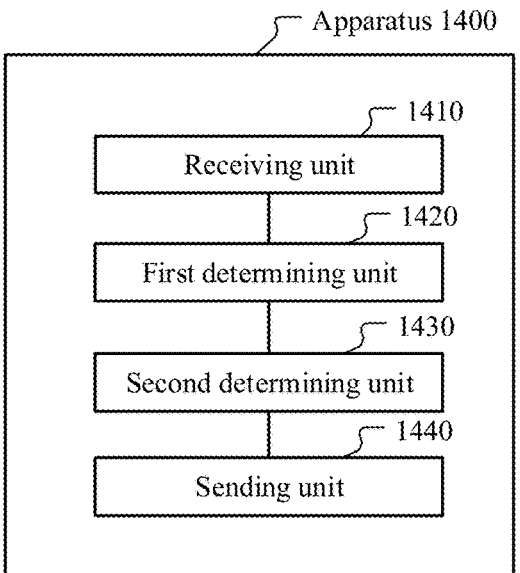
FIG. 13 is a schematic diagram of a structure of a local device discovery list according to an embodiment of this application.
FIG. 14 is a schematic diagram of a structure of a neighborhood aware network-based device connection apparatus according to an embodiment of this application.

FIG. 13 shows a structure of the local device discovery list. The device 600 may update the local device discovery list of the device 600 based on a quantity of available connections of each device. Specifically, the quantity of available connections of each device may be recorded in the local device discovery list of the device 600. In an example, as shown in FIG. 13, the quantity of available connections of the device 410 may be set to 0, the quantity of available connections of the device 420 may be set to 2, the quantity of available connections of the device 430 may be set to 3, the quantity of available connections of the device 440 may be set to 3, the quantity of available connections of the device 450 may be set to 3, and the quantity of available connections of the device 460 may be set to 3.

For example, as described above, each broadcast message may include device information of each corresponding device, for example, a MAC address of the device. The device 600 may record a MAC address of a device corresponding to each broadcast message in the local device discovery list. In an example, as shown in FIG. 13, a MAC address of the device 410 may be set to a MAC address D1, a MAC address of the device 420 may be set to a MAC address D2, a MAC address of the device 430 may be set to a MAC address D3, a MAC address of the device 440 may be set to a MAC address D4, a MAC address of the device 450 may be set to a MAC address D5, and a MAC address of the device 460 may be set to a MAC address D6.

For example, it may be understood that when sending the broadcast message 411, the device 410 has enabled the Wi-Fi function. The device 600 may detect a Wi-Fi signal that is received by the device 600 and transmitted by the device 410, and measure signal strength of the Wi-Fi signal. For example, received signal strength indication (RSSI) of the Wi-Fi signal may be measured, and a value of the RSSI obtained through measurement is recorded in the local device discovery list. With reference to the RSSI that is measured by the device 600 and that is of the Wi-Fi signal received by the device 600 from the device 410, the device 600 may separately measure RSSI values of Wi-Fi signals received by the device 600 from the device 420, the device 430, the device 440, the device 450, and the device 460, and record the RSSI values in the local device discovery list. In an example, as shown in FIG. 13, an RSSI value that is measured by the device 600 and that corresponds to the device 410 may be set to a value R1, an RSSI value corresponding to the device 420 may be set to a value R2, an RSSI value corresponding to the device 430 may be set to a value R3, an RSSI value corresponding to the device 440 may be set to a value R4, an RSSI value corresponding to the device 450 may be set to a value R5, and an RSSI value corresponding to the device 460 may be set to a value R6.

Usually, a larger RSSI value that is of a Wi-Fi signal of another device and that is measured by the device 600 indicates a shorter distance between the another device and the device 600 and better signal quality between the another device and the device 600. On the contrary, a smaller RSSI value indicates poorer signal quality between the another device and the device 600.

For example, as described above, the device 600 may determine, based on the connected device information in the broadcast message, a quantity of connected devices of the device corresponding to the broadcast message. The device 600 may record a quantity of connected devices of the device 410 or the like in the local device discovery list. For example, the connected device of the discovered device that is recorded in the local device discovery list refers to a one-hop neighbor of the discovered device. For a solution for determining a one-hop neighbor of a discovered device, refer to the foregoing description. Details are not described herein again. In an example, as shown in FIG. 13, a quantity of connected devices of the device 410 may be set to 4, a quantity of connected devices of the device 420 may be set to 2, a quantity of connected devices of the device 430 may be set to 1, a quantity of connected devices of the device 440 may be set to 1, a quantity of connected devices of the device 450 may be set to 1, and a quantity of connected devices of the device 460 may be set to 1.

For example, as described above, the broadcast message may include a device type of a corresponding device. The device 600 may record a device type of the device 410 or the like in the local device discovery list. In an example, as shown in FIG. 13, a device type of the device 410 may be set to a mobile phone, a device type of the device 420 may be set to a large-screen device, a device type of the device 430 may be set to a speaker, a device type of the device 440 may be set to a speaker, a device type of the device 450 may be set to a watch, and a device type of the device 460 may be set to a speaker.

In the foregoing manner, the device 600 updates the local device discovery list.

Next, the device 600 may determine a target device from locally discovered devices of the device 600. Next, an example of determining the target device is used for description.

In some embodiments, the device 600 has a local service interest list, and the local service interest list includes one or more service identifiers. As mentioned above, the service identifier is used to identify a service. The service identifier in the local service interest list of the device 600 is used to identify a service required by the device 600. For example, in a scenario in which the device 600 needs to perform image sharing, if the device 600 needs a file transfer service, the local service interest list of the device 600 includes a file transfer service identifier. For another example, in a scenario in which the device 600 needs to perform projection onto another device, the local service interest list of the device 600 may include an audio decoding service identifier and a video decoding service identifier.

In a first illustrative example of these embodiments, the broadcast message may include a service identifier. The device 600 may match the service identifier in any broadcast message with the service identifier in the local service interest list. A device corresponding to a broadcast message that can match the local service interest list is determined as the target device. The broadcast message 411 is used as an example. The broadcast message 411 includes the file transfer service identifier. If the local service interest list of the device 600 includes the file transfer service identifier, it is determined that the broadcast message 411 can match the local service interest list, so that it is determined that the device 410 is the target device.

In an example, when the local service interest list includes a plurality of service identifiers, if one or more of the service identifiers are consistent with the service identifiers in the broadcast message, it is considered that the broadcast message matches the local service interest list.

In an example, when it is determined that the device 410 is the target device, a Wi-Fi connection to the target device may be automatically initiated.

In a second illustrative example of these embodiments, when the broadcast message matches the local service interest list, the device 600 may display a function area including device identifier information of a device corresponding to the broadcast message. For the device identifier information, refer to the foregoing description. Details are not described herein again. In response to an operation for the function area, the device 600 may determine that the device corresponding to the broadcast message is the target device, and initiate the Wi-Fi connection to the target device.

Figure 11D:
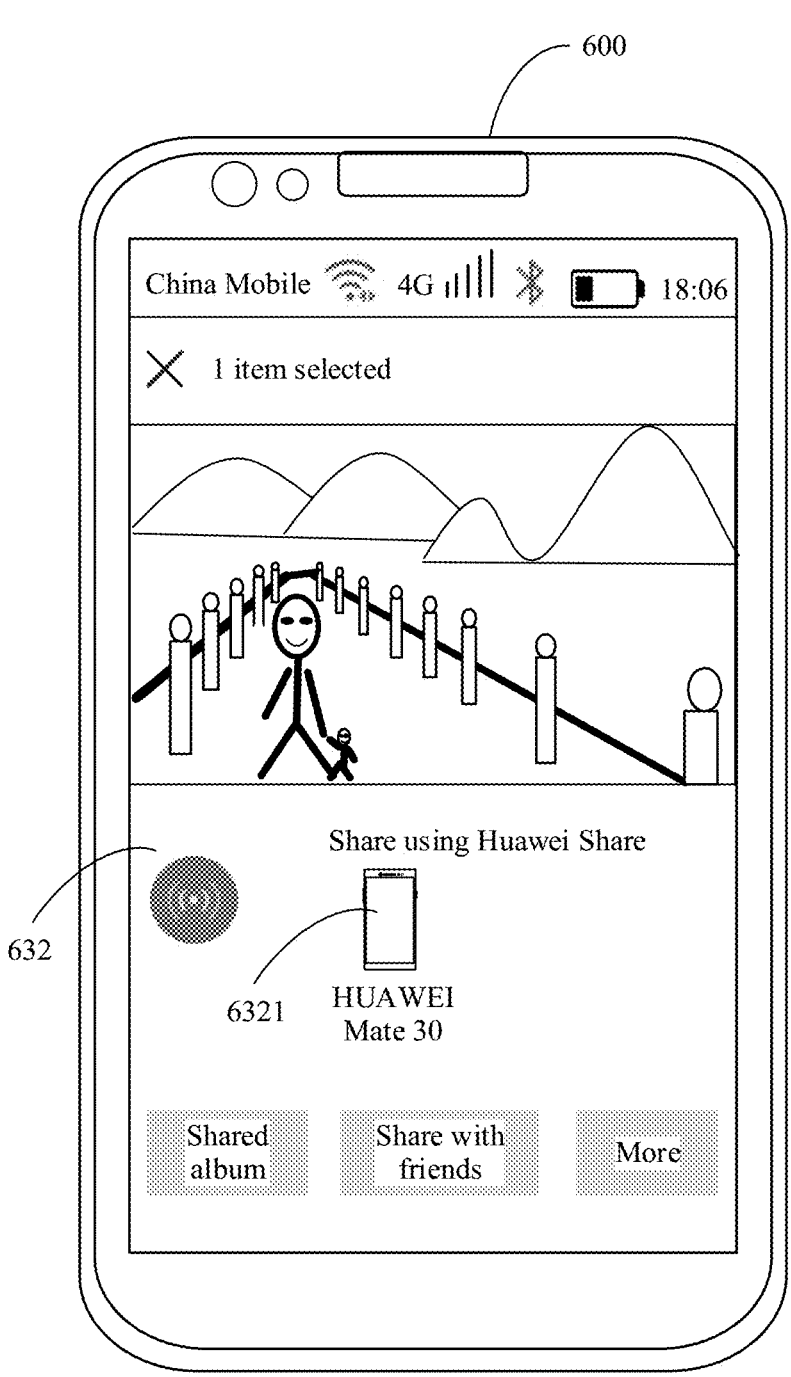
FIG. 11D is a schematic diagram of a user interface according to an embodiment of this application.
Figure 11E:
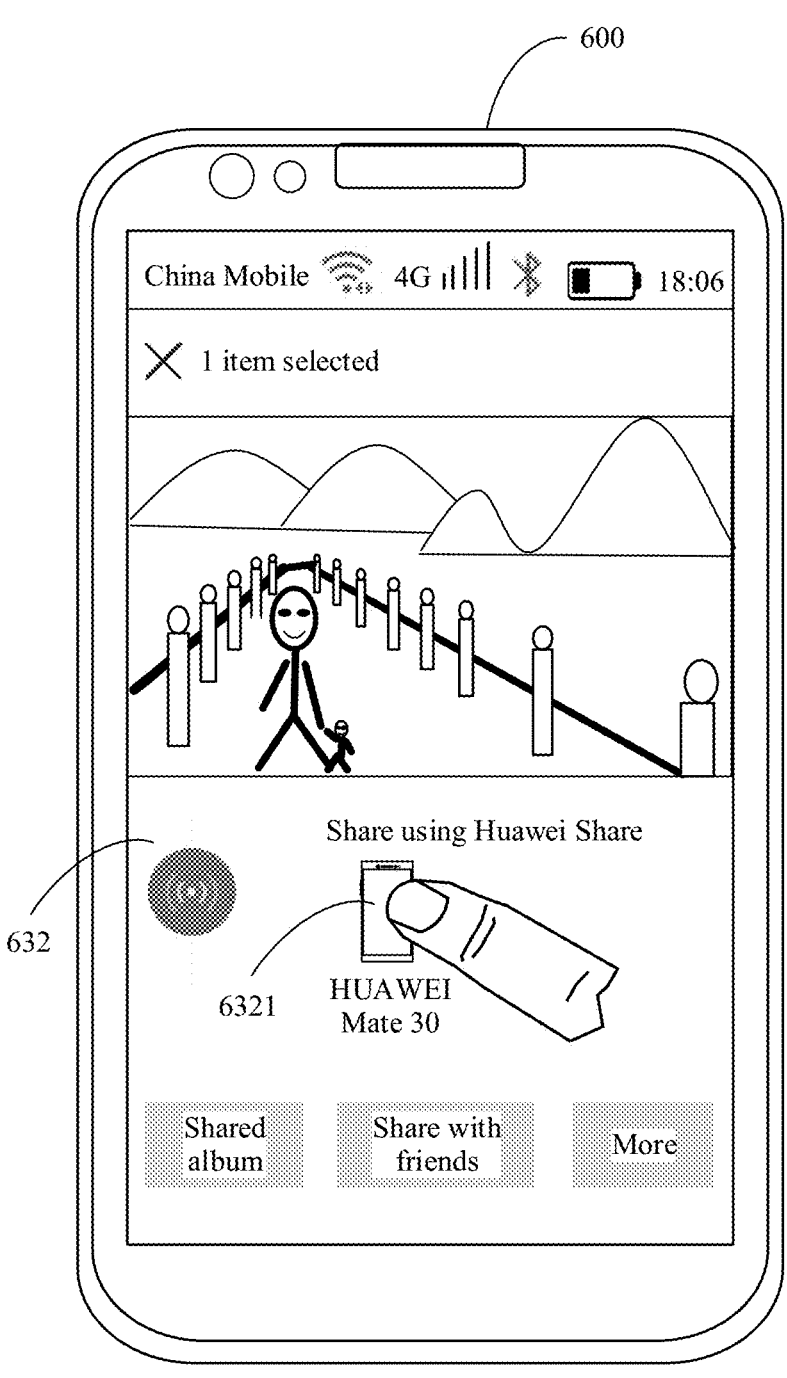
FIG. 11E is a schematic diagram of a user interface according to an embodiment of this application.

In a case of this example, with reference to FIG. 11D and FIG. 11E, a scenario in which the device 600 performs image sharing is used as an example. When it is determined that the broadcast message 411 matches the local service interest list of the device 600, the device 600 may display a prompt function area 632. The prompt function area 632 includes the device identifier information of the device 410. The device type of the device 410 may be set to a mobile phone, whose name is "HUAWEI Mate 30". The prompt function area 632 may display a mobile phone icon 6321 and "HUAWEI Mate 30". The device 600 may determine that the device 410 is the target device in response to an operation for the mobile phone icon 6321.

Figure 12D:
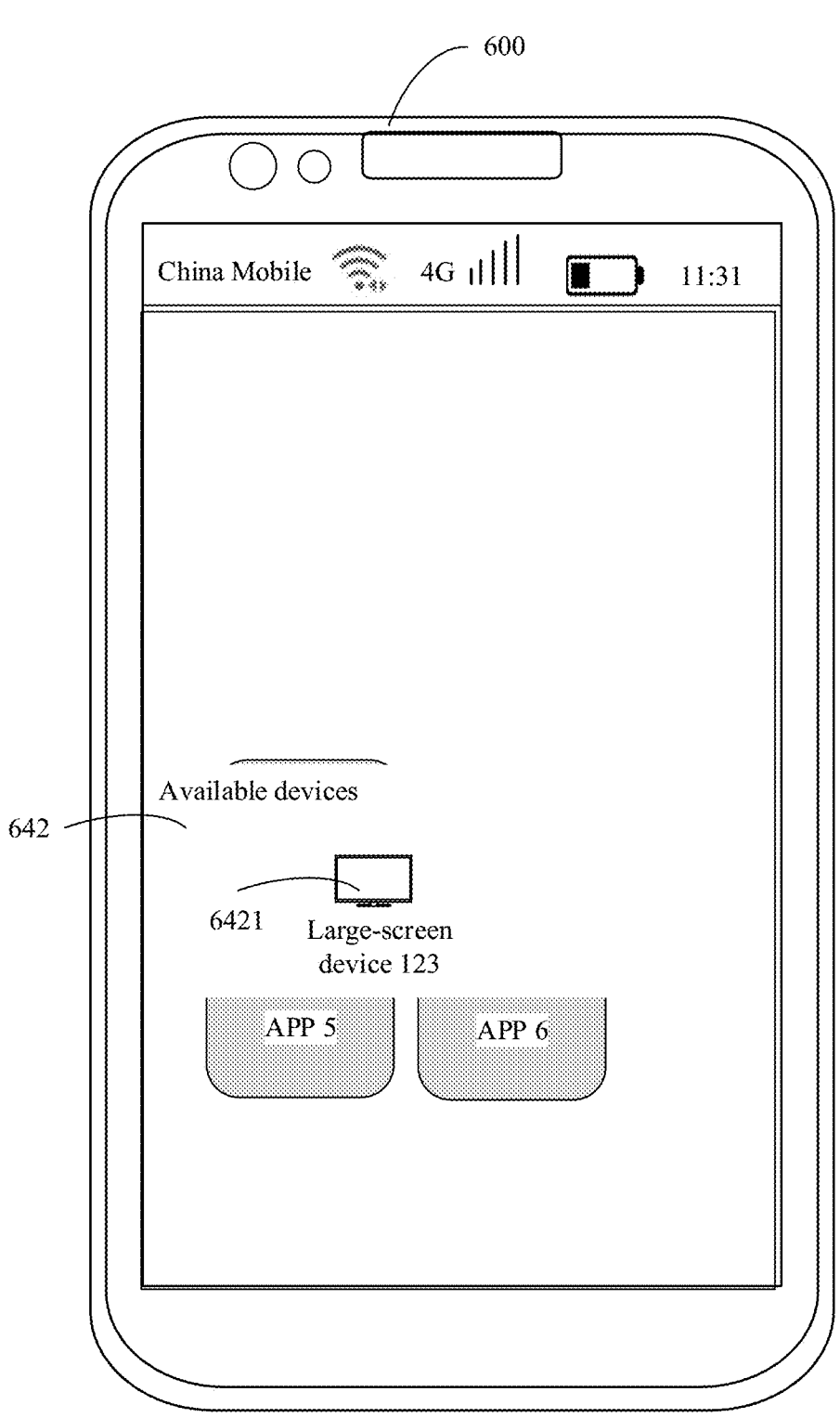
FIG. 12D is a schematic diagram of a user interface according to an embodiment of this application.
Figure 12E:
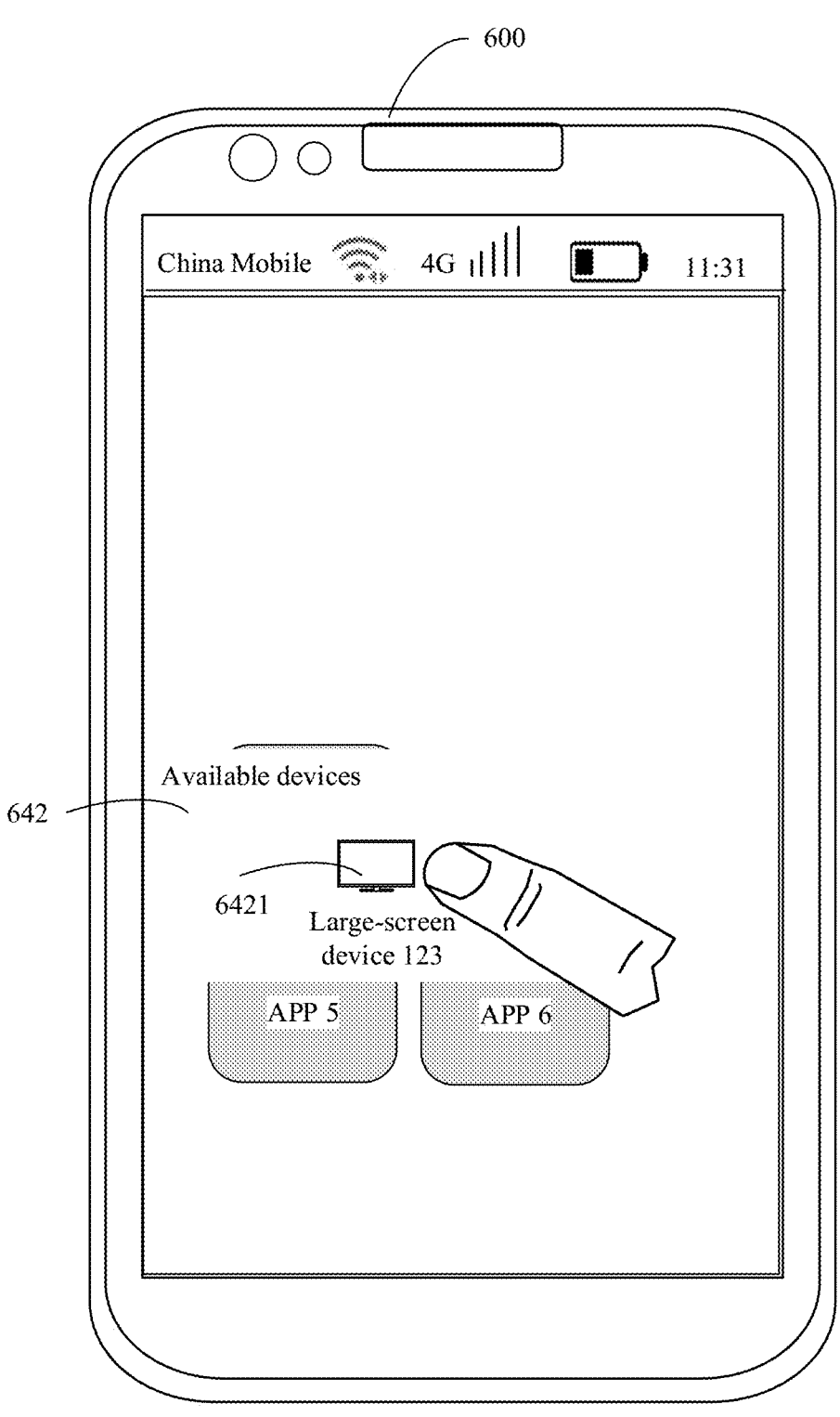
FIG. 12E is a schematic diagram of a user interface according to an embodiment of this application.

In another case of this example, with reference to FIG. 12D and FIG. 12E, a scenario in which the device 600 performs projection onto another device is used as an example. When it is determined that the broadcast message 421 matches the local service interest list of the device 600, the device 600 may display a prompt function area 642. The prompt function area 642 includes device identifier information of the device 420. The device type of the device 420 may be set to a large-screen device, whose name is "Large-screen device 123". The prompt function area 642 may display a large-screen device icon 6421 and "Large-screen device 123". The device 600 may determine that the device 420 is the target device in response to an operation for the mobile phone icon 6421.

In some embodiments, in a case in which the broadcast message does not include the service identifier, the device 600 does not have the local service interest list, or the device 600 does not match the service identifier in the broadcast message with that in the local service interest list, the device 600 may directly display device identifier information of the discovered device of the device 600.

Figure 11F:
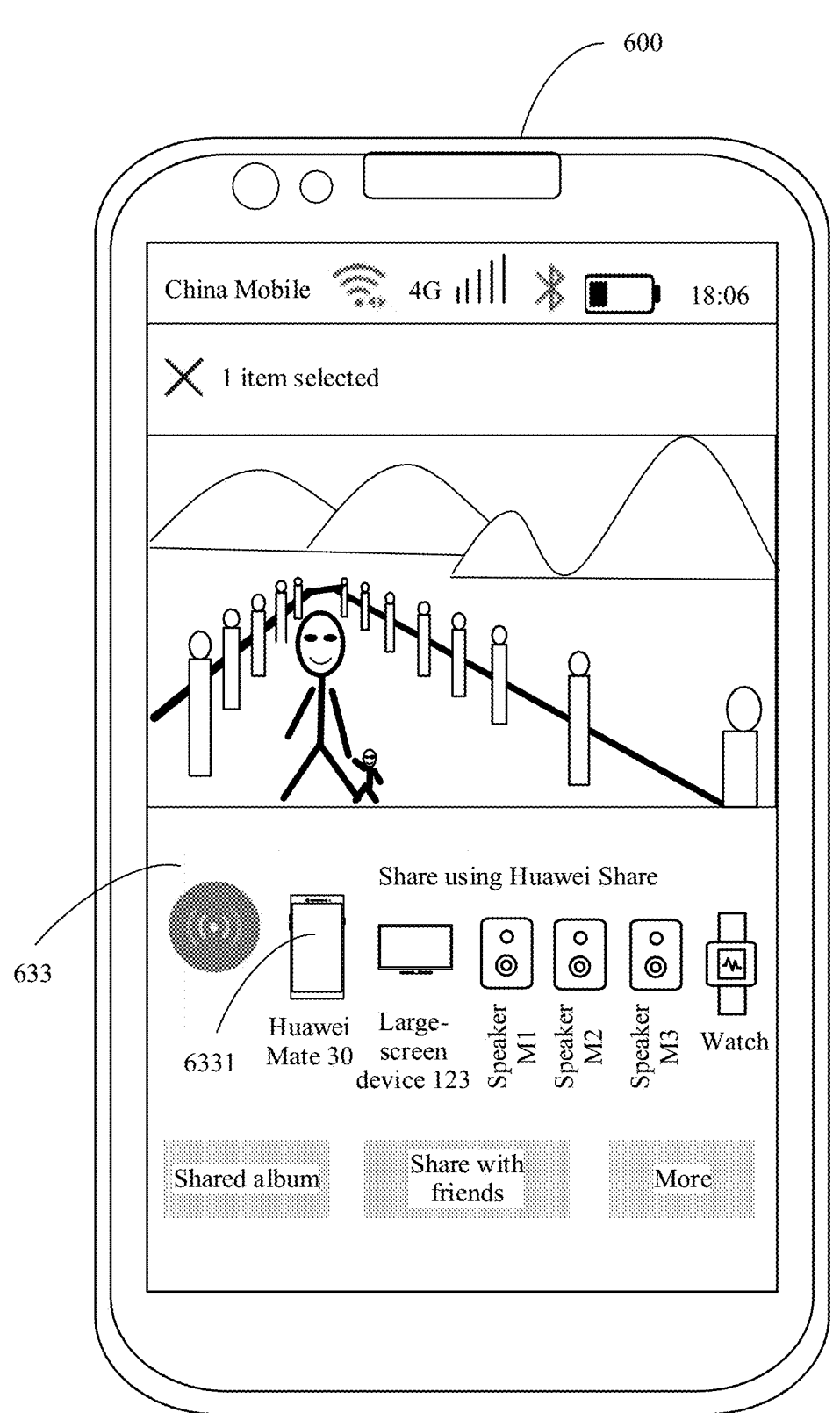
FIG. 11F is a schematic diagram of a user interface according to an embodiment of this application.
Figure 11G:
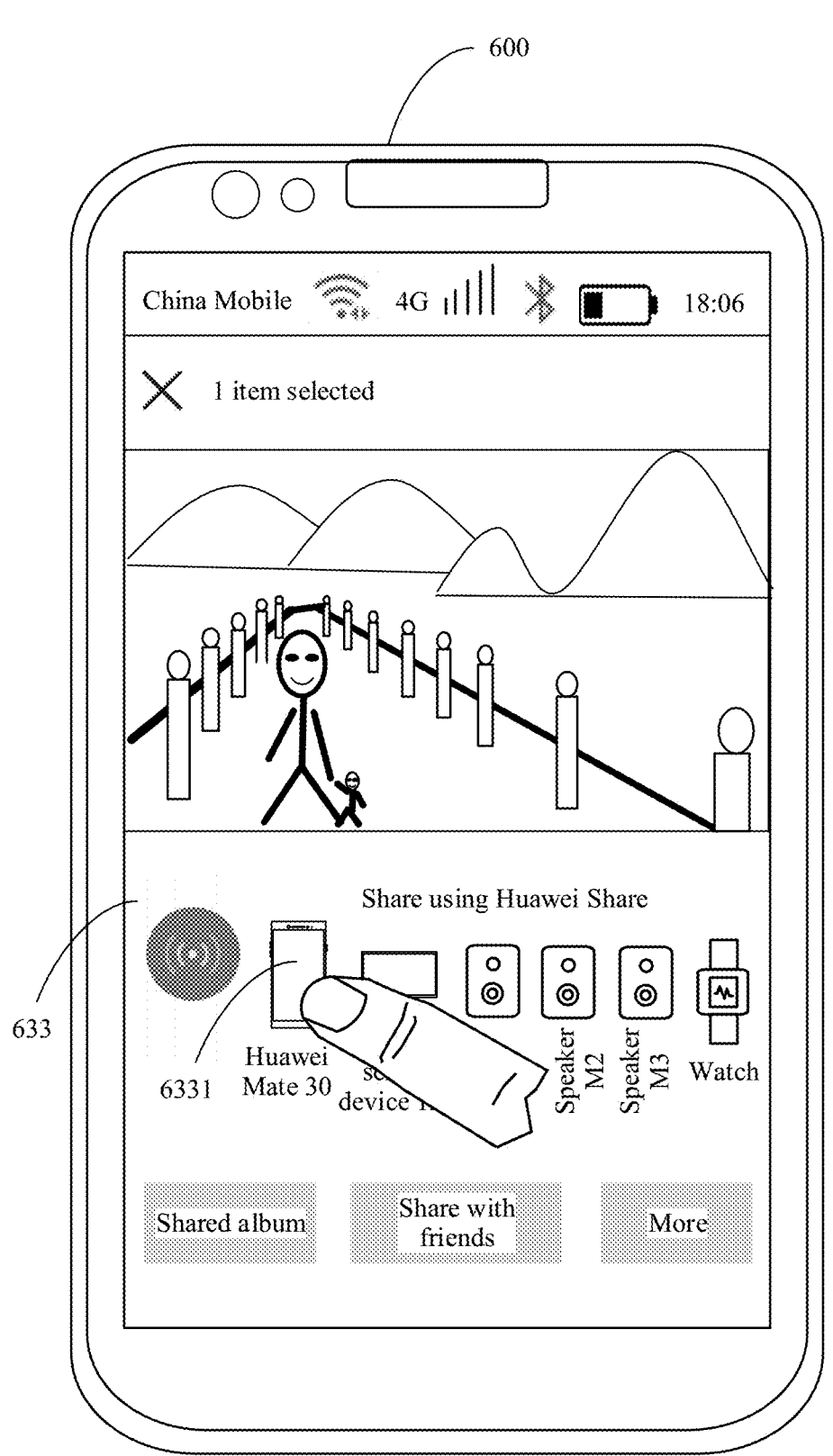
FIG. 11G is a schematic diagram of a user interface according to an embodiment of this application.

In an example, with reference to FIG. 11F and FIG. 11G, the device 600 may display a prompt function area 633. The prompt function area 633 includes an icon (a mobile phone icon 6331) and a name ("HUAWEI Mate 30") of the discovered device 410 of the device 600, an icon (a large-screen device icon) and a name ("Large-screen device 123") of the device 420, an icon (a speaker icon) and a name ("Speaker M1") of the device 430, an icon (a speaker icon) and a name ("Speaker M2") of the device 440, an icon (a speaker icon) and a name ("Speaker M3") of the device 460, and an icon (a watch icon) and a name ("Watch") of the device 450. For example, the device 600 may determine that the device 410 is the target device in response to an operation for the mobile phone icon 6331.

Figure 12F:
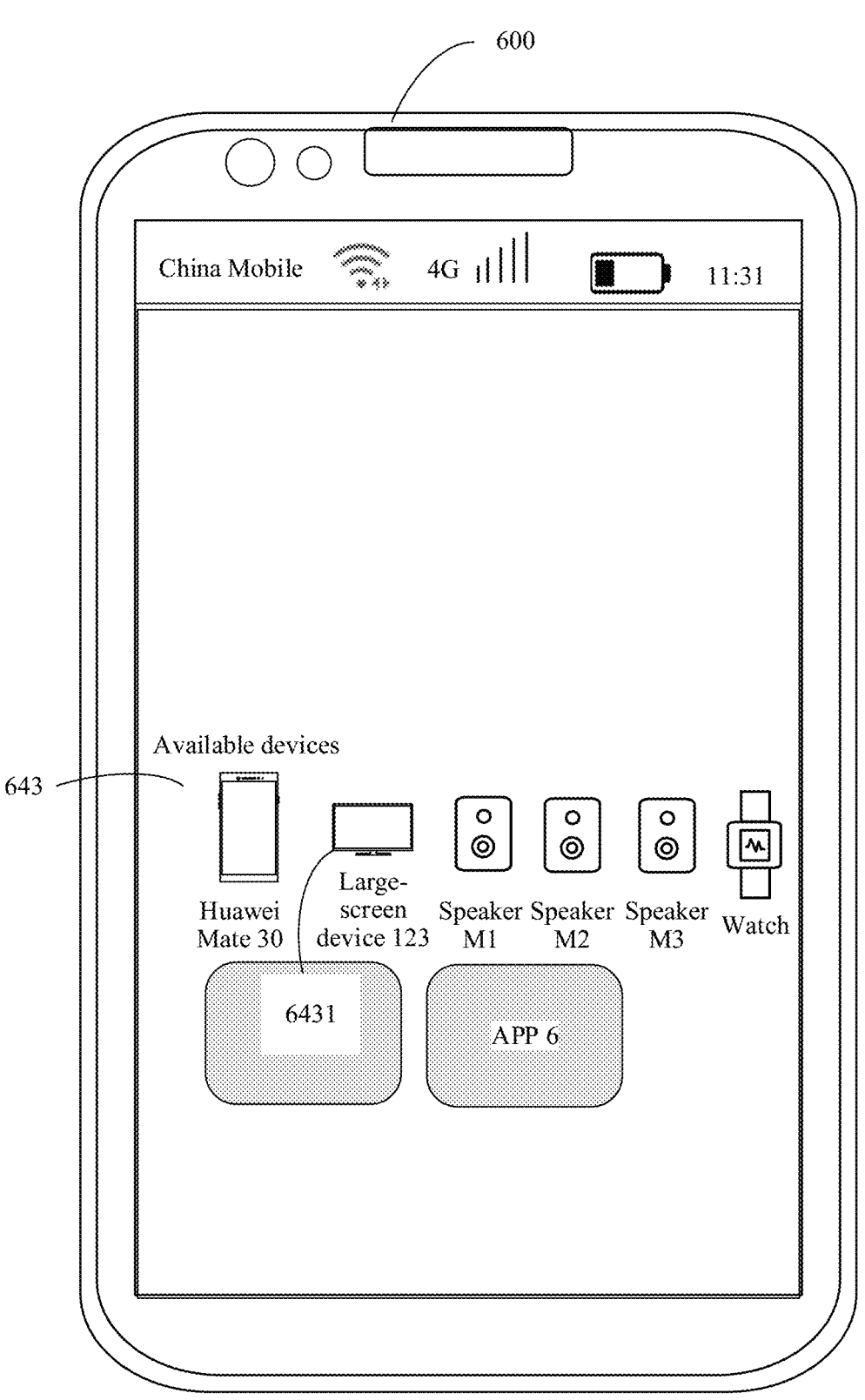
FIG. 12F is a schematic diagram of a user interface according to an embodiment of this application.
Figure 12G:
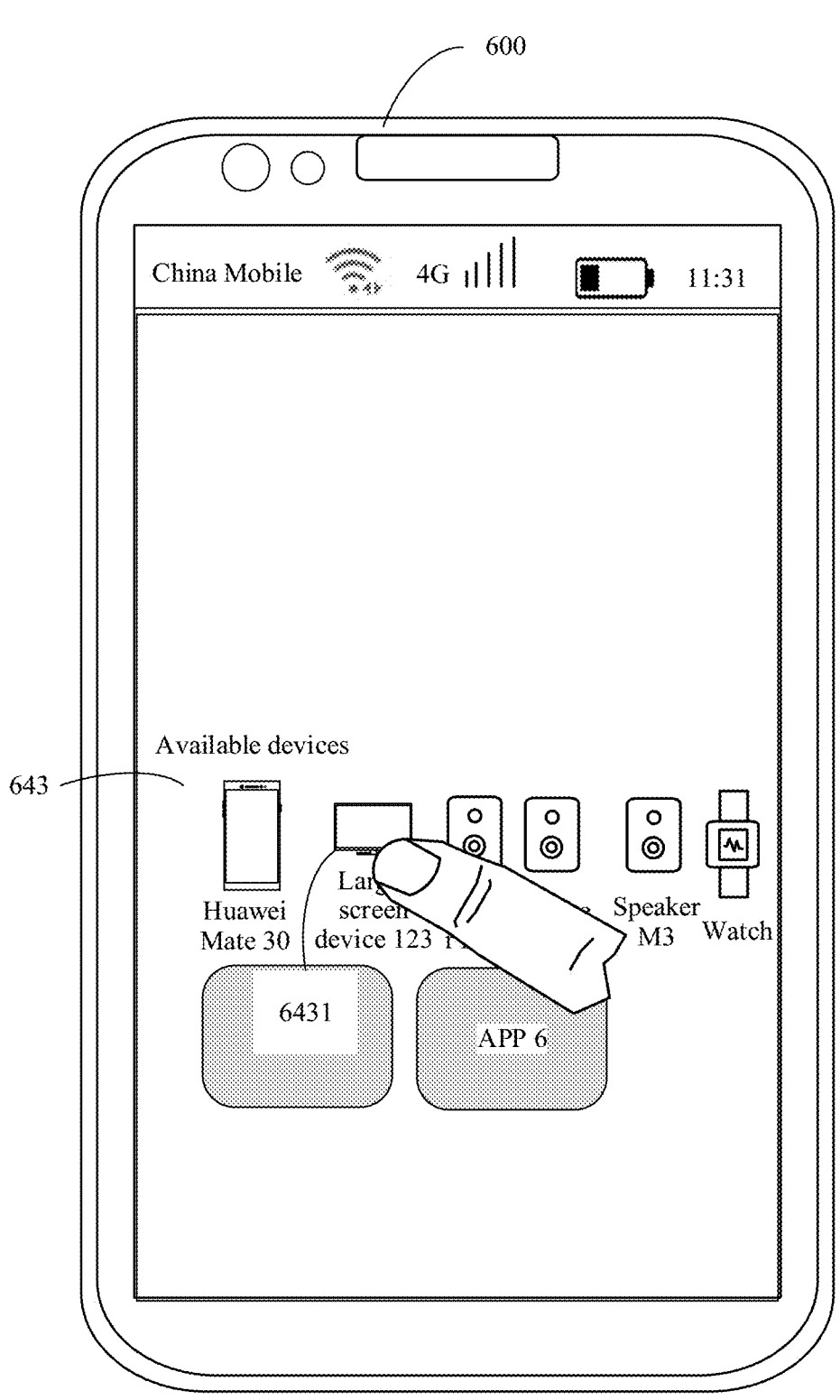
FIG. 12G is a schematic diagram of a user interface according to an embodiment of this application.

In an example, with reference to FIG. 12F and FIG. 12G, the device 600 may display a prompt function area 643. The prompt function area 643 includes an icon (a mobile phone icon) and a name ("HUAWEI Mate 30") of the discovered device 410 of the device 600, an icon (a large-screen device icon 6431) and a name ("Large-screen device 123") of the device 420, an icon (a speaker icon) and a name ("Speaker M1") of the device 430, an icon (a speaker icon) and a name ("Speaker M2") of the device 440, an icon (a speaker icon) and a name ("Speaker M3") of the device 460, and an icon (a watch icon) and a name ("Watch") of the device 450. For example, the device 600 may determine that the device 420 is the target device in response to an operation for the large-screen device icon 6431.

The icons of the foregoing devices may be determined by the device 600 based on the device types carried in the broadcast message. For example, when the device type carried in the broadcast message is a mobile phone, the device 600 may determine that the icon of the device sending the broadcast information is the mobile phone icon.

Figure 11H:
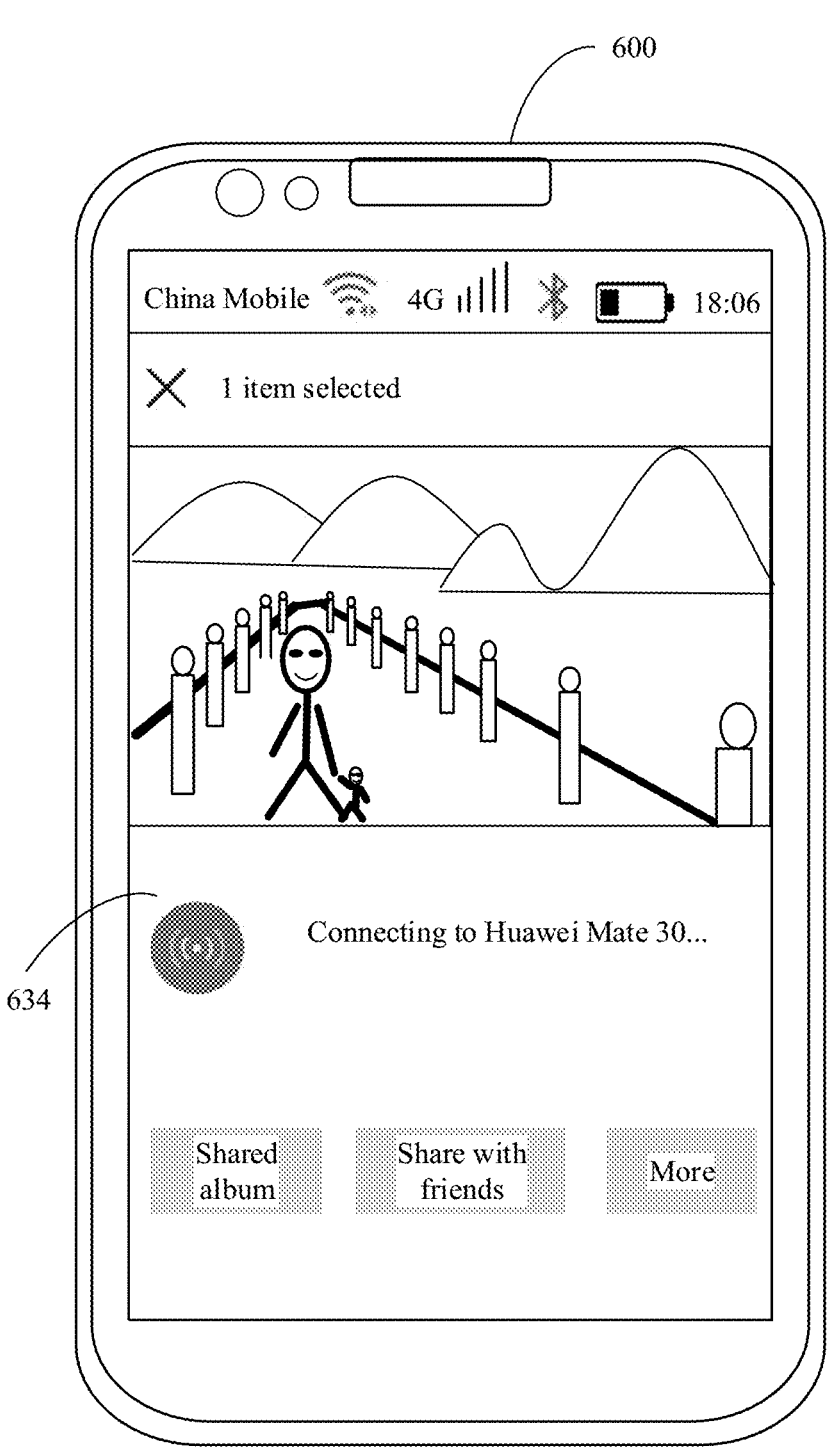
FIG. 11H is a schematic diagram of a user interface according to an embodiment of this application.
Figure 12H:
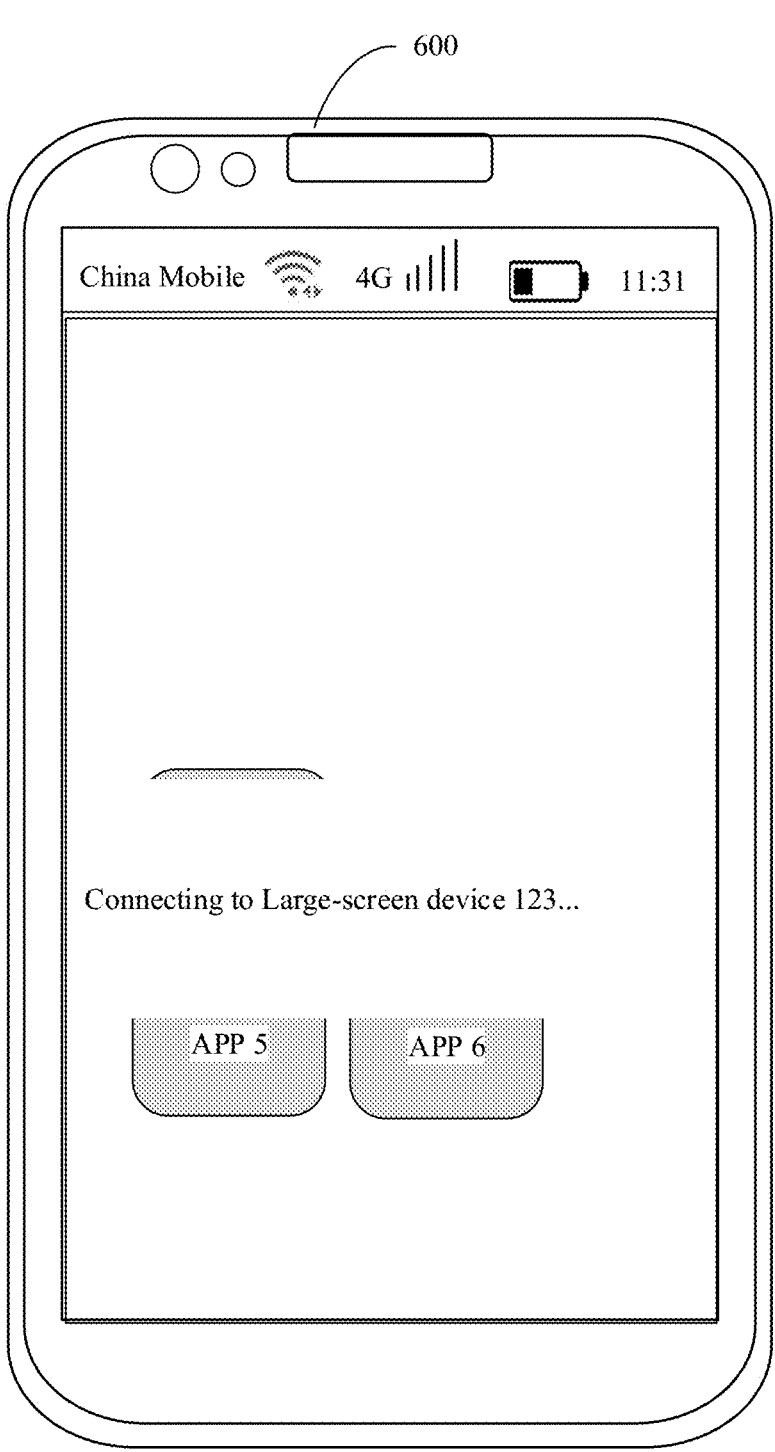
FIG. 12H is a schematic diagram of a user interface according to an embodiment of this application.

In the foregoing manner, the target device may be determined. After determining the target device, the device 600 may initiate a connection to the target device. In an example, with reference to FIG. 11H, it may be set that the device 410 is determined as the target device, and the device 600 may display prompt information used to prompt that the device 600 is connecting to the target device (HUAWEI Mate 30, that is, the device 410). In an example, with reference to FIG. 12H, it may be set that the device 420 is determined as the target device, and the device 600 may display prompt information used to prompt that the device 600 is connecting to the target device (the large-screen device 123, that is, the device 420).

Next, a solution in which the device 600 connects to the target device is described by using an example in which the device 600 performs step 705 shown in FIG. 7A to determine that the device 410 is the target device. For a specific implementation of the step 705, refer to the foregoing description.

The device 600 may determine whether the quantity of available connections of the device 410 is greater than 0. For example, the quantity of available connections of the device 410 may be obtained by searching the local device discovery list, and then whether the quantity of available connections of the device 410 is greater than 0 may be determined.

When the quantity of available connections of the device 410 is greater than 0, the device 600 may perform step 709a in FIG. 7B. A Wi-Fi link between the device 600 and the device 410 may be established. Specifically, the device 600 sends an NAN data path request to the device 410, the device 410 sends an NAN data path response to the device 600, the device 600 sends an NAN data path confirm to the device 410, and the device 410 sends an NAN data path key install to the device 600. Therefore, the Wi-Fi link between the device 600 and the device 410 may be established. In this embodiment of this application, the Wi-Fi link may also be referred to as a Wi-Fi NAN data path.

When the quantity of available connections of the device 410 is not greater than 0, that is, when the quantity of available connections of the device 410 is 0, and there is no direct Wi-Fi connection or multi-hop Wi-Fi connection between the device 600 and the device 410, the device 600 may perform step 709b in FIG. 7B, to determine whether there is an available relay device. That is, it is determined whether there is a device that can serve as a relay device for performing the Wi-Fi connection between the device 410 and the device 600, to establish a multi-hop Wi-Fi link between the device 410 and the device 600.

For example, the device 600 determines, based on whether a heartbeat packet of the device 410 is received, whether there is the direct Wi-Fi connection or the multi-hop Wi-Fi connection between the device 600 and the device 410. For another example, the device 600 may determine, based on a routing table of the device 600, whether there is the direct Wi-Fi connection or the multi-hop Wi-Fi connection between the device 600 and the device 410. Therefore, the device 600 may determine whether there is the direct Wi-Fi connection or the multi-hop Wi-Fi connection between the device 600 and the device 410. For a specific solution in which the device 600 determines whether there is the direct Wi-Fi connection or the multi-hop Wi-Fi connection between the devices 600 and the device 410, refer to descriptions of existing Wi-Fi-related protocols. Details are not described herein again.

For ease of description, a relay device used to perform the multi-hop Wi-Fi connection between the device 600 and the device 410 may be briefly referred to as a relay device between the device 600 and the device 410 or a relay device between the device 410 and the device 600.

It may be understood that the relay device between the device 600 and the device 410 may be both a neighbor of the connected device of the device 410 and a discovered device of the device 600, and a quantity of available connections is greater than 0. When the relay device between the device 600 and the device 410 is determined, the connected device information of the device 410 may be compared with the local device discovery list of the device 600, to determine a device that belongs to both the connected device of the device 410 and the discovered device of the device 600. If a device belongs to both the connected device of the device 410 and the discovered device of the device 600, it is determined, based on the local device discovery list, whether a quantity of available connections of the device is greater than 0. If the quantity of available connections of the device is greater than 0, it may be determined that the device may serve as the relay device between the device 600 and the device 410.

For example, the connected device information of the device 410 carried in the broadcast message 411 may be a MAC address of the connected device of the device 410, and the local device discovery list records the MAC address of the discovered device. A device B1 may be set to any connected device of the device 410. The local device discovery list can be searched for a MAC address that is consistent with a MAC address of the device B1. If the MAC address consistent with that of the device B1 is found, it is determined that the device B1 is both the connected device of the device 410 and the discovered device of the device 600. It can be learned from the foregoing descriptions that the local device discovery list records a quantity of available Wi-Fi connections of the discovered device of the device 600. Therefore, a quantity of available Wi-Fi connections of the device B1 may be further determined based on the local device discovery list. If the quantity of available connections of the device B1 is greater than 0, it may be determined that the device B1 may serve as the relay device between the device 600 and the device 410.

In some embodiments, the connected device of the device 410 may refer to the one-hop neighbor of the device 410. In other words, the connected device information in the broadcast message 411 is used to represent the one-hop neighbor of the device 410. If there is no discovered device of the device 600 in the one-hop neighbors of the device 410, or there is no device whose quantity of available connections is greater than 0, the device 410 may determine the relay device from two-hop neighbors of the device 410. For example, as described above, when the connected device information in the broadcast message 411 represents the one-hop neighbor of the device 410 by default, the device 600 may determine that the device represented by the connected device information in the broadcast message 411 is the one-hop neighbor of the device 410. For example, as described above, the connected device information in the broadcast message 411 further includes a quantity of neighbor hops, and the device 600 may determine that a device whose quantity of neighbor hops is 1 is the one-hop neighbor of the device 410.

In this embodiment, a solution of determining the two-hop neighbors of the device 410 and determining the relay device from the two-hop neighbors is as follows. The device 600 may compare the connected device information of the device 410 with the local device discovery list of the device 600, to determine a device that belongs to both the discovered device of the device 600 and the one-hop neighbor of the device 410. The device 600 may compare connected device information of any device (for example, the device 420) in one-hop neighbors of the device 410 with the local device discovery list of the device 600, to determine a device that belongs to both the discovered device of the device 600 and the two-hop neighbor of the device 410. The device 460 may be set belonging to both the discovered device of the device 600 and the two-hop neighbor of the device 410. Then, whether the quantity of available connections of the device 460 is greater than 0 may be determined based on the local device discovery list. If the quantity of available connections of the device 460 is greater than 0, it may be determined that the device 460 may serve as the relay device between the device 600 and the device 410. In addition, the rest may be deduced by analogy. When there is no discovered device of the device 600 in the two-hop neighbors of the device 410, or there is no device whose quantity of available connections is greater than 0, the device 600 may determine the relay device from three-hop neighbors of the device 410. According to the foregoing process, a device that may serve as the relay device between the device 600 and the device 410 may be determined.

In some embodiments, the connected device of the device 410 may refer to a device in the one-hop to n-hop neighbors of the device 410. In other words, the connected device information in the broadcast message 411 is used to represent the device in the one-hop to n-hop neighbors of the device 410. As described above, the connected device information includes a quantity of neighbor hops corresponding to the device in the one-hop to n-hop neighbors. Therefore, the device 600 may determine, based on the quantity of neighbor hops, which hop of neighbors of the device 410 is the corresponding device.

In this embodiment, the device 600 may first determine the relay device from the one-hop neighbors of the device 410. If there is no discovered device of the device 600 in the one-hop neighbors of the device 410, or there is no device whose quantity of available connections is greater than 0, the device 410 may then determine the relay device from the two-hop neighbors of the device 410. The rest may be deduced by analogy, so that the device that may serve as the relay device between the device 600 and the device 410 may be determined.

When one or more devices that may serve as the relay device between the device 600 and the device 410 are determined, the device 600 may determine the relay device from the one or more devices. The one or more devices may be referred to as candidate relay devices.

For example, when a plurality of devices that may serve as the relay device between the device 600 and the device 410 are determined, the relay device may be determined from the plurality of devices based on the RSSI value that is of each device in the plurality of devices and that is recorded in the local device discovery list. For example, a device with a largest RSSI value in the plurality of devices may be determined as the relay device.

For example, when the plurality of devices that may serve as the relay device between the device 600 and the device 410 are determined, the relay device may be determined from the plurality of devices based on a quantity of connected devices of each device in the plurality of devices. It may be understood that, usually, a larger quantity of connected devices of the device indicates more information that needs to be sent or received by the device, so that the Wi-Fi link is busier. Therefore, a device with a smallest quantity of connected devices in the plurality of devices may be determined as the relay device.

For example, when the plurality of devices that may serve as the relay device between the device 600 and the device 410 are determined, the relay device may be determined from the plurality of devices based on a device type of each device in the plurality of devices. It may be understood that devices with different device types have different battery capacities or different power supply manners. For example, a power supply manner of a large-screen device or a speaker is a long-time power supply (that is, a connected power supply). A battery capacity of a watch is relatively small, and a battery capacity of a mobile phone is relatively large compared with the battery capacity of the watch. Therefore, when the plurality of devices include a long-time power supply device, the long-time power supply device may be determined as the relay device. When the plurality of devices do not include the long-time power supply device, a device with a relatively large battery capacity may be determined as the relay device. During specific implementation, different device types may be pre-associated with different priorities. For example, a priority corresponding to a large-screen device is higher than a priority corresponding to a mobile phone, and a priority corresponding to a mobile phone is higher than a priority corresponding to a watch. The relay device may be determined from the plurality of devices based on a priority corresponding to the device type to which each of the plurality of devices belongs.

Next, a solution in which the device 600 establishes a multi-hop Wi-Fi connection between the device 600 and the target device by using the relay device is described by using an example in which the device 600 performs step 711b shown in FIG. 7C to determine that the device 440 is the relay device between the device 600 and the device 410. For a specific implementation of the step 711b, refer to the foregoing description.

When it is determined that the device 440 is the relay device between the device 600 and the device 410, the device 600 may perform step 713b to establish a Wi-Fi link between the device 600 and the device 440. Specifically, the device 600 sends an NAN data path request to the device 440, the device 440 sends an NAN data path response to the device 600, the device 600 sends an NAN data path confirm to the device 440, and the device 410 sends an NAN data path key install to the device 600. Therefore, the Wi-Fi link between the device 600 and the device 440 may be established.

For example, as shown in FIG. 7C, after the Wi-Fi link between the device 600 and the device 440 is established, there is a multi-hop Wi-Fi link between the device 600 and the device 410. The multi-hop Wi-Fi link includes the Wi-Fi link between the device 600 and the device 440 and a Wi-Fi link between the device 440 and the device 410. The device 600 and the device 410 may interact with each other through the multi-hop Wi-Fi link. Specifically, after the Wi-Fi link between the device 600 and the device 440 is established, the routing table of the device 600. For example, when the device 600 needs to send image data (text data, audio data, video data, or the like) to the device 410, the device 600 may encapsulate the image data and the device 410 into a packet, and the device 600 may determine, based on the routing table of the device 600 and the MAC address of the device 410, that the device 440 is a next-station device for packet forwarding. Therefore, the device 600 may send the packet to the device 440. After receiving the packet, the device 440 may parse a MAC layer of the packet, to learn that a destination address of the packet is the device 410. The device 440 determines, based on a routing table of the device 440 and the destination address of the packet, that the device 410 is the next-station device for packet forwarding. Therefore, the device 440 forwards the packet to the device 410. After receiving the packet, the device 410 parses the MAC layer to obtain the MAC address whose destination address is the device 410. The device 410 may further parse the image data in the packet, to receive the image data from the device 600.

Similarly, the device 410 may also send, to the device 440 through the Wi-Fi link, a packet whose target device is the device 600. When receiving the packet, the device 440 may forward the packet to the device 600 through the Wi-Fi link.

In an illustrative example, a TCP session may be performed between the device 600 and the device 410. A packet of the TCP session may be sent by using the following steps.

The device 600 may perform step 715b to send a TCP packet to the device 440. The device 440 may perform step 717b to forward, to the device 410, the TCP packet received by the device 440 from the device 600. The device 410 may perform step 719b to send an ACK or an NACK to the device 440. The device 440 may perform step 721b to forward, to the device 600, the ACK or the NACK received by the device 440 from the device 410.

Therefore, file transfer between the device 410 and the device 600 or projection may be completed by using the TCP session.

According to the method provided in this embodiment of this application, when a quantity of available Wi-Fi connections of a target device is not greater than 0, a scanning device can quickly determine a relay device from devices to which the target device is connected through Wi-Fi, and establish a multi-hop Wi-Fi connection between the scanning device and the target device by using the relay device, so that the scanning device can be connected to the target device through Wi-Fi.

Refer to FIG. 14. An embodiment of this application provides a neighborhood aware network-based device connection apparatus 1400. The apparatus 1400 may be configured in an electronic device that supports a neighborhood aware network (Wi-Fi NAN) protocol. Refer to FIG. 14. The apparatus 1400 includes a receiving unit 1410, a first determining unit 1420, a second determining unit 1430, and a sending unit 1440.

The receiving unit 1410 is configured to receive a first broadcast message from a second device. The first broadcast message includes connected device information of the second device and Wi-Fi connection information of the second device, and the connected device information is used to represent a device to which the second device is connected through Wi-Fi.

The receiving unit 1410 is further configured to receive a second broadcast message from a third device. The second broadcast message includes Wi-Fi connection information of the third device.

The first determining unit 1420 is configured to determine that the second device is a target device.

The second determining unit 1430 is further configured to: when a quantity of available Wi-Fi connections of the second device is not greater than zero, and the second device is not a device to which a first device is connected through Wi-Fi, determine, based on the connected device information of the second device and available Wi-Fi connection information of the third device, that the third device belongs to the device to which the second device is connected through Wi-Fi and that a quantity of available Wi-Fi connections of the third device is greater than zero. The quantity of available Wi-Fi connections of the second device is determined based on the Wi-Fi connection information of the second device.

The sending unit 1440 is configured to send a Wi-Fi link establishment request to the third device, to establish a Wi-Fi link between the first device and the third device.

The sending unit 1440 is further configured to send, to the third device through the Wi-Fi link between the first device and the third device, a first packet whose destination is the second device, so that the third device forwards the first packet to the second device through a Wi-Fi link between the third device and the second device.

Function units of the apparatus 1400 may be implemented with reference to the method embodiment shown in FIG. 7A, FIG. 7B, and FIG. 7C, for example, as shown in FIG. 7A, FIG. 7B, and FIG. 7C. Details are not described herein again.

The foregoing mainly describes the apparatus provided in this embodiment of this application from a perspective of a method process. It may be understood that, to implement the foregoing functions, the terminal includes corresponding hardware structures and/or software modules for performing the functions. A person skilled in the art should be easily aware that, with reference to units and algorithm steps in the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the electronic device or the like may be divided into function modules according to the method embodiment shown in FIG. 7A, FIG. 7B, and FIG. 7C. For example, each function module may be obtained through division based on each corresponding function, or two or more functions may be integrated into one processing module. The integrated module may be implemented in a form of hardware, or may be implemented in a form of a software function module. It should be noted that, in embodiments of this application, module division is an example, and is merely logical function division. In an actual implementation, another division manner may be used.

According to the apparatus provided in this embodiment of this application, when a quantity of available Wi-Fi connections of a target device is not greater than 0, a scanning device can quickly determine a relay device from devices to which the target device is connected through Wi-Fi, and establish a multi-hop Wi-Fi connection between the scanning device and the target device by using the relay device, so that the scanning device can be connected to the target device through Wi-Fi.

Figure 15:
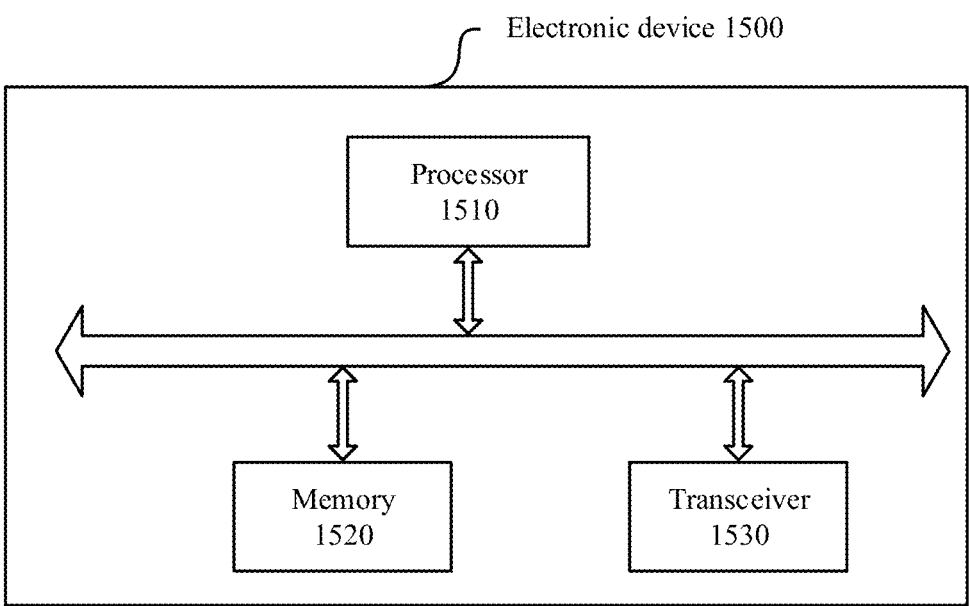
FIG. 15 is a schematic diagram of a structure of an electronic device according to an embodiment of this application.

Refer to FIG. 15. An embodiment of this application provides an electronic device 1500. The electronic device 1500 may support a neighborhood aware network (Wi-Fi NAN) protocol. The electronic device 1500 may perform operations performed by the device 600 in the foregoing method embodiments, as shown in FIG. 7A, FIG. 7B, and FIG. 7C. The electronic device 1500 may include a processor 1510, a memory 1520, and a transceiver 1530. The memory 1520 stores instructions, and the instructions may be executed by the processor 1510. When the instructions are executed by the processor 1510, the electronic device 1500 may perform operations performed by the device 600 in the foregoing method embodiments, as shown in FIG. 7A, FIG. 7B, and FIG. 7C. Specifically, the processor 1510 may perform a data processing operation, and the transceiver 1530 may perform a data sending and/or receiving operation.

Figure 16:
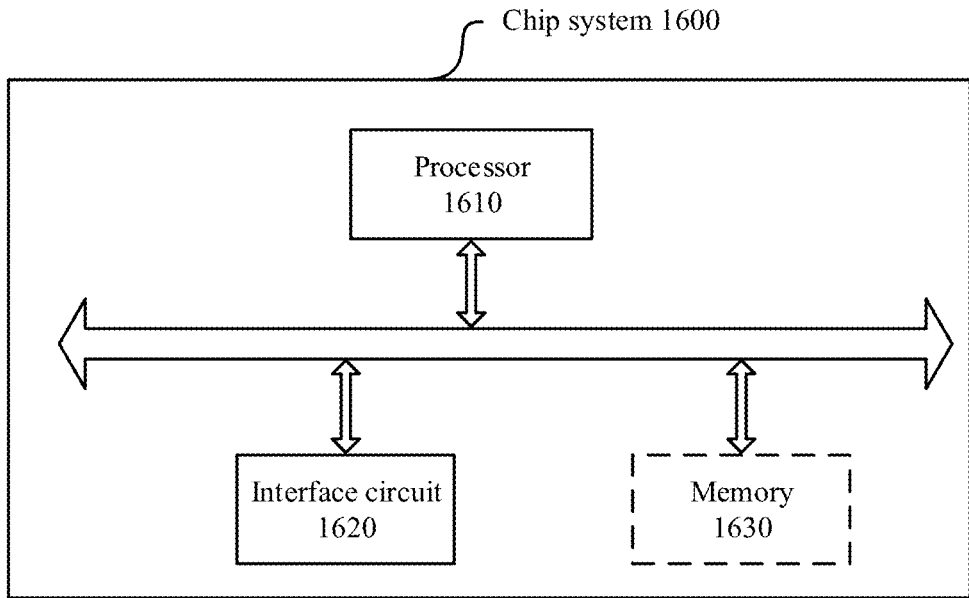
FIG. 16 is a schematic diagram of a structure of a chip system according to an embodiment of this application.

Refer to FIG. 16. An embodiment of this application provides a chip system 1600 that can be applied to an electronic device. The chip system 1600 includes a processor 1610 and an interface circuit 1620. The processor 1610 is connected to the interface circuit 1620, and is configured to perform operations performed by the device 600 in the foregoing method embodiments, as shown in FIG. 7A, FIG. 7B, and FIG. 7C.

In some embodiments, the chip system 1600 further includes a memory 1630. The memory stores instructions, and the instructions may be executed by the processor 1610. When the instructions are executed by the processor 1610, the chip system 1600 may perform operations performed by the device 600 in the foregoing method embodiments, as shown in FIG. 7A, FIG. 7B, and FIG. 7C.

It may be understood that, the processor in embodiments of this application may be a central processing unit (CPU), the processor may further be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any conventional processor.

The method steps in embodiments of this application may be implemented in a hardware manner, or may be implemented in a manner of executing software instructions by the processor. The software instructions may include corresponding software modules. The software modules may be stored in a random access memory (RAM), a flash memory, a read-only memory (ROM), a programmable read-only memory (programmable ROM, PROM), an erasable programmable read-only memory (erasable PROM, EPROM), an electrically erasable programmable read-only memory (electrically EPROM, EEPROM), a register, a hard disk, a removable hard disk, a CD-ROM, or any other form of storage medium well-known in the art. For example, a storage medium is coupled to a processor, so that the processor can read information from the storage medium or write information into the storage medium. Certainly, the storage medium may be a component of the processor. The processor and the storage medium may be disposed in an ASIC.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

It may be understood that numerical symbols involved in embodiments of this application are differentiated merely for ease of description, but are not used to limit the scope of embodiments of this application.

What is claimed is:

1. A method performed by a first device comprising:
receiving a first broadcast message from a second device, wherein the first broadcast message comprises connected device information of the second device and Wi-Fi connection information of the second device, and the connected device information indicates a device to which the second device is connected through Wi-Fi;

receiving a second broadcast message from a third device, wherein the second broadcast message comprises Wi-Fi connection information of the third device, and wherein the first and second broadcast messages are received over a Wi-Fi Neighbor Awareness Networking (NAN) protocol;

determining that the second device is a target device;

in response to determining that a quantity of available Wi-Fi connections of the second device is not greater than zero, and the second device is not a device to which the first device is connected through Wi-Fi, determining, without an involvement of any centralized coordination device and based on the connected device information of the second device and available Wi-Fi connection information of the third device, that the third device belongs to the device to which the second device is connected through Wi-Fi and that a quantity of available Wi-Fi connections of the third device is greater than zero, wherein the quantity of available Wi-Fi connections of the second device is determined based on the Wi-Fi connection information of the second device;

sending a Wi-Fi link establishment request to the third device to establish a Wi-Fi link between the first device and the third device; and sending, to the third device through the Wi-Fi link between the first device and the third device, a first packet for the third device to forward to the second device through a Wi-Fi link between the third device and the second device.

2. The method according to claim 1, wherein the method further comprises:
in response to determining that the quantity of available Wi-Fi connections of the second device is greater than zero, and the second device is not the device to which the first device is connected through Wi-Fi, sending a Wi-Fi link establishment request to the second device to establish a Wi-Fi link between the first device and the second device.

3. The method according to claim 1, wherein the first broadcast message further comprises a first service identifier indicating a service that can be provided by the second device; and
the determining that the second device is the target device comprises:
searching a local service interest list for a service identifier corresponding to the first service identifier, wherein the local service interest list comprises at least one service identifier indicating at least one service required by the first device; and
in response to identifying the service identifier corresponding to the first service identifier in the local service interest list, determining that the second device is the target device.

4. The method according to claim 1, wherein the first broadcast message further comprises identifier information of the second device; and
the determining that the second device is the target device comprises:
displaying a first interface, wherein the first interface comprises a first function area corresponding to the identifier information; and
in response to an operation for the first function area, determining that the second device is the target device.

5. The method according to claim 1, wherein the Wi-Fi connection information of the second device comprises a maximum quantity of Wi-Fi connections of the second device or the quantity of available Wi-Fi connections of the second device, wherein when the Wi-Fi connection information of the second device comprises the maximum quantity of Wi-Fi connections of the second device, the quantity of available Wi-Fi connections of the second device is determined based on the maximum quantity of Wi-Fi connections of the second device and the connected device information of the second device.

6. The method according to claim 1, wherein the Wi-Fi connection information of the third device comprises a maximum quantity of Wi-Fi connections of the third device or the quantity of available Wi-Fi connections of the third device, wherein when the Wi-Fi connection information of the third device comprises the maximum quantity of Wi-Fi connections of the third device, the second broadcast message further comprises connected device information of the third device, and the quantity of available Wi-Fi connections of the third device is determined based on the maximum quantity of Wi-Fi connections of the third device and the connected device information of the third device.

7. The method according to claim 1, wherein the connected device information of the second device comprises a MAC address of the device to which the second device is connected through Wi-Fi.

8. The method according to claim 1, wherein at least one of the first broadcast message or the second broadcast message belongs to a Bluetooth broadcast frame.

9. An electronic device that comprises at least one processor and a memory, wherein the memory stores computer instructions for execution by the at least one processor to perform operations comprising:

receiving a first broadcast message from a second device, wherein the first broadcast message comprises connected device information of the second device and Wi-Fi connection information of the second device, and the connected device information is used to represent a device to which the second device is connected through Wi-Fi;

receiving a second broadcast message from a third device, wherein the second broadcast message comprises Wi-Fi connection information of the third device, and wherein the first and second broadcast messages are received over a Wi-Fi Neighbor Awareness Networking (NAN) protocol;

determining that the second device is a target device;

in response to determining that a quantity of available Wi-Fi connections of the second device is not greater than zero, and the second device is not a device to which the electronic device is connected through Wi-Fi, determining, without an involvement of any centralized coordination device and based on the connected device information of the second device and available Wi-Fi connection information of the third device, that the third device belongs to the device to which the second device is connected through Wi-Fi and that a quantity of available Wi-Fi connections of the third device is greater than zero, wherein the quantity of available Wi-Fi connections of the second device is determined based on the Wi-Fi connection information of the second device;

sending a Wi-Fi link establishment request to the third device to establish a Wi-Fi link between the electronic device and the third device; and sending, to the third device through the Wi-Fi link between the electronic device and the third device, a first packet for the third device to forward to the second device through a Wi-Fi link between the third device and the second device.

10. The electronic device according to claim 9, wherein the operations further comprising:

in response to determining that the quantity of available Wi-Fi connections of the second device is greater than zero, and the second device is not the device to which the electronic device is connected through Wi-Fi, sending a Wi-Fi link establishment request to the second device to establish a Wi-Fi link between the electronic device and the second device.

11. The electronic device according to claim 9, wherein the first broadcast message further comprises a first service identifier indicating a service that can be provided by the second device; and the operations further comprising:

searching a local service interest list for a service identifier corresponding to the first service identifier, wherein the local service interest list comprises at least one service identifier indicating at least one service required by the electronic device; and in response to identifying the service identifier corresponding to the first service identifier in the local service interest list, determining that the second device is the target device.

12. The electronic device according to claim 9, wherein the first broadcast message further comprises identifier information of the second device; and the operations further comprising:

displaying a first interface, wherein the first interface comprises a first function area corresponding to the identifier information; and in response to an operation for the first function area, determining that the second device is the target device.

13. The electronic device according to claim 9, wherein the Wi-Fi connection information of the second device comprises a maximum quantity of Wi-Fi connections of the second device or the quantity of available Wi-Fi connections of the second device, wherein when the Wi-Fi connection information of the second device comprises the maximum quantity of Wi-Fi connections of the second device, the quantity of available Wi-Fi connections of the second device is determined based on the maximum quantity of Wi-Fi connections of the second device and the connected device information of the second device.

14. The electronic device according to claim 9, wherein the Wi-Fi connection information of the third device comprises a maximum quantity of Wi-Fi connections of the third device or the quantity of available Wi-Fi connections of the third device, wherein when the Wi-Fi connection information of the third device comprises the maximum quantity of Wi-Fi connections of the third device, the second broadcast message further comprises connected device information of the third device, and the quantity of available Wi-Fi connections of the third device is determined based on the maximum quantity of Wi-Fi connections of the third device and the connected device information of the third device.

15. The electronic device according to claim 9, wherein the connected device information of the second device comprises a MAC address of the device to which the second device is connected through Wi-Fi.

16. The electronic device according to claim 9, wherein at least one of the first broadcast message or the second broadcast message belongs to a Bluetooth broadcast frame.

17. A non-transitory computer readable medium storing computer instructions executable by at least one processor of an electronic device to perform operations comprising:

receiving a first broadcast message from a second device, wherein the first broadcast message comprises connected device information of the second device and Wi-Fi connection information of the second device, and the connected device information is used to represent a device to which the second device is connected through Wi-Fi;

receiving a second broadcast message from a third device, wherein the second broadcast message comprises Wi-Fi connection information of the third device, and wherein the first and second broadcast messages are received over a Wi-Fi Neighbor Awareness Networking (NAN) protocol;

determining that the second device is a target device;

in response to determining that a quantity of available Wi-Fi connections of the second device is not greater than zero, and the second device is not a device to which the electronic device is connected through Wi-Fi, determining, without an involvement of any centralized coordination device and based on the connected device information of the second device and available Wi-Fi connection information of the third device, that the third device belongs to the device to which the second device is connected through Wi-Fi and that a quantity of available Wi-Fi connections of the third device is greater than zero, wherein the quantity of available Wi-Fi connections of the second device is determined based on the Wi-Fi connection information of the second device;

sending a Wi-Fi link establishment request to the third device to establish a Wi-Fi link between the electronic device and the third device; and sending, to the third device through the Wi-Fi link between the electronic device and the third device, a first packet for the third device to forward to the second device through a Wi-Fi link between the third device and the second device.

18. The non-transitory computer readable medium according to claim 17, wherein the operations further comprising:

in response to determining that the quantity of available Wi-Fi connections of the second device is greater than zero, and the second device is not the device to which the electronic device is connected through Wi-Fi, sending a Wi-Fi link establishment request to the second device, to establish a Wi-Fi link between the electronic device and the second device.

19. The non-transitory computer readable medium according to claim 17, wherein the first broadcast message further comprises a first service identifier indicating a service that can be provided by the second device; and the operations further comprising:

searching a local service interest list for a service identifier corresponding to the first service identifier, wherein the local service interest list comprises at least one service identifier indicating at least one service required by the electronic device; and in response to identifying the service identifier corresponding to the first service identifier in the local service interest list, determining that the second device is the target device.

20. The non-transitory computer readable medium according to claim 17, wherein the first broadcast message further comprises identifier information of the second device; and the operations further comprising:

displaying a first interface, wherein the first interface comprises a first function area corresponding to the identifier information; and in response to an operation for the first function area, determining that the second device is the target device.

* * * * *